US011157937B2

(12) United States Patent
Ezra et al.

(10) Patent No.: US 11,157,937 B2
(45) Date of Patent: Oct. 26, 2021

(54) SMART REWARDS INCENTIVE SYSTEM, CLIENT TOOLS FOR IMPLEMENTING A SMART REWARDS INCENTIVE SYSTEM, AND ANALYTICS ENGINE

(71) Applicant: VisuaLimits, LLC, Las Vegas, NV (US)

(72) Inventors: Aron Ezra, Henderson, NV (US); Keith Michel, Henderson, NV (US); Slav Kulik, Mansfield, MA (US); Pierre Darbouze, Santa Clara, CA (US)

(73) Assignee: VisuaLimits, LLC, Las Vegas, NV (US)

( * ) Notice: Subject to any disclaimer, the term of this patent is extended or adjusted under 35 U.S.C. 154(b) by 442 days.

(21) Appl. No.: 14/971,880

(22) Filed: Dec. 16, 2015

(65) Prior Publication Data

US 2016/0171525 A1 Jun. 16, 2016

Related U.S. Application Data

(60) Provisional application No. 62/092,682, filed on Dec. 16, 2014.

(51) Int. Cl.
*G06Q 30/02* (2012.01)
(52) U.S. Cl.
CPC ..... *G06Q 30/0225* (2013.01); *G06Q 30/0209* (2013.01); *G06Q 30/0235* (2013.01)
(58) Field of Classification Search
CPC ........... G06Q 30/0209; G06Q 30/0207; G06Q 30/0208; G06Q 30/0212; G06Q 30/0218; G06Q 30/0221; G06Q 30/0269; G06Q 30/02; G06Q 30/0235
See application file for complete search history.

(56) References Cited

U.S. PATENT DOCUMENTS

| | | | |
|---|---|---|---|
| 6,434,534 B1 * | 8/2002 | Walker | G06Q 20/10 705/14.13 |
| 7,958,081 B2 * | 6/2011 | Fitzpatrick | G06Q 10/06311 |
| 2003/0069832 A1 * | 4/2003 | Czepluch | G06Q 40/04 705/37 |
| 2003/0200144 A1 * | 10/2003 | Antonucci | G06Q 30/0601 705/14.28 |
| 2004/0006478 A1 * | 1/2004 | Alpdemir | G06Q 30/02 704/275 |

(Continued)

*Primary Examiner* — David J Stoltenberg
*Assistant Examiner* — Robert C Johnson
(74) *Attorney, Agent, or Firm* — Ulmer & Berne LLP

(57) ABSTRACT

A server based system and method for hosting an incentive creation, administration, distribution, management, and analytics system. The server may allow a client via a client management portal to create and manage a campaign that may include a variety of dynamic rewards geared specifically to specific consumer groups. In these embodiments, users may be presented with the dynamic rewards via a presentation device which may be a user device or a client device. The presentation device may include a facilitator application for presenting the offer to the user. The dynamic rewards may have terms that change over time based on factors such as end user input, environmental factors, sharing of the reward, trading the reward, expiration date extensions, etc.

14 Claims, 17 Drawing Sheets

(56) References Cited

U.S. PATENT DOCUMENTS

| | | | |
|---|---|---|---|
| 2005/0143166 A1* | 6/2005 | Walker | G07F 17/3225 |
| | | | 463/25 |
| 2006/0253324 A1* | 11/2006 | Miller | G06Q 30/0235 |
| | | | 705/14.14 |
| 2008/0201305 A1* | 8/2008 | Fitzpatrick | G06Q 30/02 |
| 2011/0010238 A1* | 1/2011 | Postrel | G06Q 30/0229 |
| | | | 705/14.38 |
| 2013/0155076 A1* | 6/2013 | Wodka | H04N 21/6582 |
| | | | 345/502 |
| 2014/0156415 A1* | 6/2014 | Argue | G06Q 30/0269 |
| | | | 705/14.66 |

\* cited by examiner

☐ Manage Embedded

20% Off Your Next Stay

Title
20% Off Your Next Stay — 502

Description
Sign up for our loyalty program and get immediate savings! — 502

Remote URL                        Preview
http://nibbler.silktide.com/ — 504

Acknowledgment Phrase

Overall

Transaction Key

Score

Transaction Value
/^\d X 1.?\d*$/

Save   Cancel

Preview

☐ Loyalty Club

Sign up Now

[ Submit ]

○ OfferCraft   CAMPAIGNS   REWARDS   QUESTIONS   GAMES   REPORTS

Questions   [List Options ▼]   [Search  x]   [Add New Question]

12 items displayed out of 27 total

✎ Please provide your name so we can contact you about your visit [Information]   [Preview ▼]

⋮⋮ How would you rate your visit on a scale from 1-5? [Visit] [Scale]   [Preview ▼]

☑ Are you likely to return within the next year? [Visit] [Loyalty]   [Preview ▼]

≡ How many people joined you on your visit? [Visit] [Groups]   [Preview ▼]

⇄ What are the top two things you'd like to see us improve before you return? [Suggestions]   [Preview ▼]

✎ Name the one thing that we should definitely not change about Kona Kea [Suggestions] [Feedback]   [Preview ▼]

⇄ How did our staff treat you? [Staff] [Visit]   [Preview ▼]

✎ What two or three words would you use to describe how you think of Kona Kea? [Short form] [Feedback]   [Preview ▼]

☑ Did our staff greet you by name? [Staff] [Satisfaction]   [Preview ▼]

☑ Was your room cleaned to you satisfaction? [Room] [Suite] [Cleanliness]   [Preview ▼]

⋮⋮ How was the food on a scale from 1-10? [Food] [Satisfaction]   [Preview ▼]

| Tags | |
|---|---|
| Cleanliness | 1 |
| Facilities | 1 |
| Feedback | 2 |
| Food | 1 |
| Groups | 1 |
| Information | 1 |
| Loyalty | 1 |
| Room | 1 |
| Satisfaction | 2 |
| Scale | 1 |
| Short form | 1 |
| Staff | 2 |
| Suggestions | 2 |
| Suite | 1 |
| Visit | 4 |
| Archive | 15 |

Key
≡ Multiple Choice
☑ Yes or No
⋮⋮ Scale from 1 to

FIG. 7

How would you rate your visit on a scale from 1-5?

Question Text

How would you rate your visit on a scale from 1-5?  — 802

Scale from 1 to ...

| Value | Label (Optional) |
|---|---|
| 1 | Poor |
| 2 | Below Average |
| 3 | Average |
| 4 | Good |
| 5 | Excellent |

Add Another

Preview
1. Poor
2. Below Average
3. Average
4. Good
5. Excellent
— 804

Tags (separated by commas)

Visit,scale | Visit | Scale | — 806

[Save] [Cancel]

Manage Questions

About the Questions — 902

Title
Answer to win! — 904

Question List

Search ×

< 1 2 3 >

✏️ Please provide your name so we can contact you about your visit — 905

📊 How would you rate your visit on a scale from 1-5?

☑️ Are you likely to return within the next year?

☰ How many people joined toy on your visit?

☐ What are the top two things you'd like to see us improve before you return?

Description — 902
Thanks for taking a minute to help us serve you better!

Selected Questions

Drag your survey questions and arrange them here — 906

1. Please provide your name so we can con ... ×
   ☑️ Required  ☐ Data Collector 2. Which of the following did you cisit/u ... ×
   ☐ Required  ☐ Data Collector Save  Cancel

Two-for-One Massage at Spa — 1202

ID 482309482300

Name: Two-for-One Massage at Spa — 1202

Short Name: Massage — 1202

Description (optional):
Treat yourself and someone you love to a relaxing Polynesian Massage that focuses on relaxing the body and mind while releasing tension in tight muscles. Drift away to sounds of waterfalls and soft music while your stresses are massaged away. — 1202

Fine Print (optional):
VOID WHERE PROHIBITED. Terms not defined in these Kona Kea Sweepstakes Terms and Conditions have the same meanings as in the Official Rules for the Sweepstakes. Unless otherwise allowed in the Sweepstakes Official Rules, the following are ineligible to...... — 1202

Value
Cost: 50
Retail: 105
— 1204

Image
Drop here — 1208

Limits
Total: 250
Per-Campaign: 25
— 1204

Delivery Options: ☑ Email ☑ SMS  Paper on-site  Instant — 1206

Link:

Tags (separated by commas):
massage, spa

Save | Cancel

Manage Rewards

Reward List  [List Options ▾]  [Search  ✕]

< 1 2 3 4 >

☐ Two-for-One Massage at Spa
☐ $5 Off at the Buffet
☐ 1 Week Free Stay at Kona Kea with Airfare
☐ 80% off Private Fishing Excursion
☐ 4x4 Land Safari or Horseback Riding Trek

1302

Selected Rewards — 1304

[Save] [Cancel]

Drag your rewards to the table below

| Prize | Quantity 1306 | % 1308 | 1310 |
|---|---|---|---|
| ☐ Two-for-One Massage at the Spa — 186 available | 25 | 45 | ✕ |
| ☐ Trip for two to Germany for BMW Factory Tour available | 1 | 0.1 | ✕ |
| ☐ Autobahn in America 50% off Racing Lesson — 4 available | 4 | 18 | ✕ |
| ☐ Half Price Helicopter Flight over Rainforest & Volcano — 8 available | 8 | 18 | ✕ |
| ☐ 75% off Hangliding Lesson or 4x4 Land Safari — 8 available | 8 | 18 | ✕ |
| ☐ BMW Corporate to Contribute $15K to Your Dealership's Advertising Budget — 1 available | 1 | 0.88 | ✕ |
| ☐ Bef the First Dealer in Your Region with a BMW 18 — 1 available | 1 | 0.1 | ✕ |
| ☐ Free 3 Year Lease on a BMW 528i — 1 available | 1 | 0.1 | ✕ |
| Total | 49 | 100% | |

1300

SMART REWARDS INCENTIVE SYSTEM, CLIENT TOOLS FOR IMPLEMENTING A SMART REWARDS INCENTIVE SYSTEM, AND ANALYTICS ENGINE

CROSS REFERENCE TO RELATED APPLICATION

This application claims priority to U.S. Provisional Application No. 62/092,682 which was filed on Dec. 16, 2014, the contents of which are hereby incorporated by reference.

BACKGROUND

1. Field

The disclosed embodiments relate to incentive systems. More specifically, the disclosed embodiments relate to server-based incentive systems for presenting offers to users, for managing, directing and administering the distribution, tracking and redemption of the offers and rewards, and for analyzing the results of these campaigns to continually improve the campaigns' effectiveness.

2. Related Art

Organizations often use incentives to entice their target audience to behave in a specific way. This can be seen in all walks of life across many different types of organizations: from incentivizing customers to buy goods or services, to incentivizing employees to suggest new product ideas or hit sales or production milestones, to incentivizing donors to contribute money or resources by a certain date, to incentivizing students to perform at a certain academic level, to incentivizing patients to comply with their physician's recommendations, etc. These incentives, or offers, require the organization to dedicate significant effort and resources toward trying to strike the right balance between something that is appealing to its target audience, while still beneficial to the organization (e.g. something that doesn't cost too much money or hurt the organization in any way).

This balance is difficult to achieve. Users often ignore or decline the offers presented by the organization for countless reasons. For example, users may not be interested in rewards that are being presented—whether they be products, services, recognition, or other some other benefit—to which the offers relate because the users do not see the benefit or value in pursuing the rewards. Users may also forget about the offers, get confused by the offer rules, decide that participating isn't worth their effort, and so on. As a result, a large portion of the people who see such offers that organizations present choose not to participate in the offers or redeem their rewards. Thus there is a need for organizations to present offers and rewards that more effectively compel people to participate in pursuing the redemption of the rewards offered.

SUMMARY

The disclosed embodiments have been developed in light of the above, and some aspects of the invention may include a server that hosts an incentive creation, administration, distribution, management, and analytics system. In certain embodiments, the server allows a client via a client management portal to create and manage a campaign that may include a variety of offers and rewards geared specifically to specific consumer groups. In these embodiments, users may be presented with the offers and rewards via a presentation device which may be a user device or a client device. The presentation device may include a facilitator application for presenting the offer to the user.

The offers and rewards issued by the organization are either ignored, rejected or accepted by the user, and may be tracked by the server. The server may track various information related to the organization's offers including user information, information on offer terms, expiration of the offer, redemption of the reward, and so forth. In some embodiments, the system may allow the client to adjust virtually any variable governing how the offer and reward are presented, distributed, tracked and used.

In certain embodiments, the system may track the offers and rewards and then report certain analytics to the client concerning the campaign, allowing the client to adjust the offer and campaigns as needed. In some embodiments, the client may pre-determine which analytics it wants reported. Additionally, the server may automatically update a client campaign based on the reported analytics.

According to one embodiment of the invention, a method of presenting a dynamic reward to an end user is provided. The method may be carried out on a server based system comprising a processor, at least one memory comprising machine-readable instructions for execution by the processor, and one or more sensors. The method may include issuing at the server a uniquely identified dynamic reward. The reward is set to include terms such as a number of redemptions, a time period in which the reward may be redeemed, and transferability criteria. The method monitors the reward to determine whether the reward has been redeemed, and when the reward is redeemed, the number of redemptions available on the reward is decreased.

The method also may include monitoring the reward to determine whether the time period in which the reward may be redeemed is expired and invalidating the number of redemptions when the reward is determined to be expired. Further, the method may comprise monitoring the reward to determine whether the reward the transferability criteria of the reward have been met. When the criteria have been met, the reward may be transferred from the end user.

In some embodiments, when the reward is transferred, the reward is traded for a second, similarly priced reward available for issuance by the server. In other embodiments, the reward is traded for a second reward issued to a second end user. In still other embodiments, the reward is shared with one or more second end users. The reward may be shared by sharing one or more of the number of redemptions with one or more second end users. The reward may also be shared by duplicating one or more redemptions with one or more second end users. In this instance, the duplicating may or may not be limited to a predetermined number of duplications.

In other embodiments, the reward may be issued by the server through at least one of email, SMS messaging, Bluetooth, and NFC. In some instances, the server may transmit one or more messages to the end user holding the reward. Such messages may comprises a notification concerning an expiration date of the reward.

In other embodiments, the reward may further comprise terms for modifying the reward after the reward is issued. The reward may be monitored and at least one of a value, the number of redemptions, the time period in which the reward may be redeemed, and the transferability criteria may be modified based on the terms for modifying the reward being satisfied. The terms for modifying the reward may include data from the one or more sensors being within a predetermined threshold. As another possibility, the terms for modifying the reward may include one or more inputs provided by the end user. For example, the inputs provided by the end user may comprise a response to a question presented by the server, a result of a game played by the user via a presentation device, and/or an indication to share the reward.

In additional embodiments of the invention, an incentive based campaign management system is provided. The System may include a server comprising a processor and at least one memory. The server may be configured to present application programming interfaces to a client presentation device. The application programming interfaces may include tools to manage one or more incentive based campaigns. The system further comprises a rules database with one or more memories comprising modules for including in an incentive based campaign, and a historical systems database with one or more memories storing historical outcomes of incentive based campaigns.

The server may execute program instructions which cause the server to receive input from a client presentation device via one of the application programming interfaces to create a set of campaigns including one or more incentives. The server may also receive a request from an end user to access the one or more campaigns, and receive data from one or more environmental and demographic sensors concerning an environment and a demographic of the end user. Based on the information received, the server may determine whether any of the one or more campaigns meets predetermined environmental and demographic thresholds. When the environmental and demographic thresholds are met, the server may present a campaign to the end user via an end user presentation device.

In some embodiments, the user, via the client presentation device, may add a game, a question, a reward, and/or third party embedded content stored on a third party data source database via the application programming interfaces. The server may present the reward to the end user presentation device upon receiving a completion of the game and/or an answering of the question from the end user presentation device. In some embodiments, the client presentation device and the end user presentation device comprise a kiosk, a personal computer, a mobile computing device, a point of sale system, and/or digital signage.

In yet another embodiment of the invention, an incentive based campaign management system is provided. The system may comprise a server with a processor and at least one memory. The server may be configured to present application programming interfaces to a client presentation device. The application programming interfaces may include tools to manage one or more dynamic rewards. The system may further comprise a rules database with one or more memories comprising modules for including in the dynamic rewards and a historical systems database with one or more memories storing historical outcomes of redemptions of dynamic rewards.

The server may store program instructions which when executed cause the server to receive input from a client presentation device via one of the application programming interfaces to create a set of dynamic rewards, receive a request from an end user to access one or more dynamic rewards of the set of dynamic rewards, and receive data from one or more environmental and demographic sensors concerning an environment and a demographic of the end user. Based on the information received, the server may determine whether any of the dynamic rewards meets predetermined environmental and demographic thresholds. The server may also determine a hierarchy of dynamic rewards based on an optimal redemption rate. When the environmental and demographic thresholds are met, the server presents a campaign based on the hierarchy to the end user via an end user presentation device.

In some embodiments, the hierarchy is determined by a number of factors including a time of day, a time of week, a month, a current temperature, a likely demographic of a detected user, a number of potential detected users, an amount of traffic in a nearby area, and/or past performance of dynamic rewards in similar conditions.

Other systems, methods, features and advantages of the invention will be or will become apparent to one with skill in the art upon examination of the following figures and detailed description. Furthermore, the features and advantages of the invention may be learned by the practice of the invention. It is intended that all such additional systems, methods, features and advantages be included within this description, be within the scope of the invention. The described embodiments are to be considered in all respects only as illustrative and not restrictive.

BRIEF DESCRIPTION OF THE DRAWINGS

FIG. 3 shows an exemplary application programming interface for creating and editing a campaign in a smart incentive system according to one embodiment of the invention.

FIG. 4 shows an exemplary application programming interface for managing a plurality of campaigns in a smart incentive system according to one embodiment of the invention.

FIG. 5 shows an exemplary application programming interface for managing third party embedded content for a campaign in a smart incentive system according to one embodiment of the invention.

FIG. 7 shows an exemplary application programming interface for managing a plurality of questions utilized in a smart incentive system according to one embodiment of the invention.

FIG. 8 shows an exemplary application programming interface for creating and editing a question utilized in a smart incentive system according to one embodiment of the invention.

FIG. 9 shows an exemplary application programming interface for embedding one or more questions for a campaign in a smart incentive system according to one embodiment of the invention.

FIG. 11 shows an exemplary application programming interface for managing a plurality of rewards utilized in a smart incentive system according to one embodiment of the invention.

FIG. 12 shows an exemplary application programming interface for creating and editing a reward utilized in smart incentive system according to one embodiment of the invention.

FIG. 13 shows an exemplary application programming interface for embedding one or more rewards for a campaign in a smart incentive system according to one embodiment of the invention.

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Embodiments of a server-based smart incentive system with facilitating client tools and analytics will be discussed below. The disclosed embodiments provide systems that effectively promote offers to users such that users may associate a value with the offer, be more likely to redeem the offer and may be more likely to redeem additional offers from the organization, including those that have been customized either to a user, user group or situation. The systems described combine randomized and pre-determination algorithms, configuration and rules-based calculations, software running on remote servers, and client software running on connected local devices. This disclosure is intended to provide a general description of certain exemplary embodiments and is not meant to be exhaustive. One skilled in the art will appreciate that the invention may be embodied by a variety of configurations.

It is often the case that when a user has fun in order to obtain an offer, the user is more likely to participate in the offer and to remember to redeem the reward. Thus, in one embodiment, a server-based incentive system may incorporate gamification tactics or actual games when presenting an offer to a user. In some embodiments, these games might include point of sale games for tablets, computers, smartphones, kiosks or digital signage. In certain embodiments, the user may play games to win rewards that are immediately redeemable, redeemable in the future or even to receive mystery prizes to incentivize the user to come back to the store at a later time. When the user then receives the reward, the user may feel that he or she has earned the reward as a result of the game. Because the user then sees the offer as a prize that he or she has earned, the user is more likely to redeem the offer.

The disclosed embodiments provide systems and methods whereby an organization may administer or manage campaigns, track and modify offers in real time, and evaluate the effectiveness of the various offers and rewards issued. In this manner, the organization can increase the effectiveness of its offers and rewards to more effectively inspire users to participate in the offers and redeem the rewards in higher numbers as compared to traditional techniques.

Figure 1:
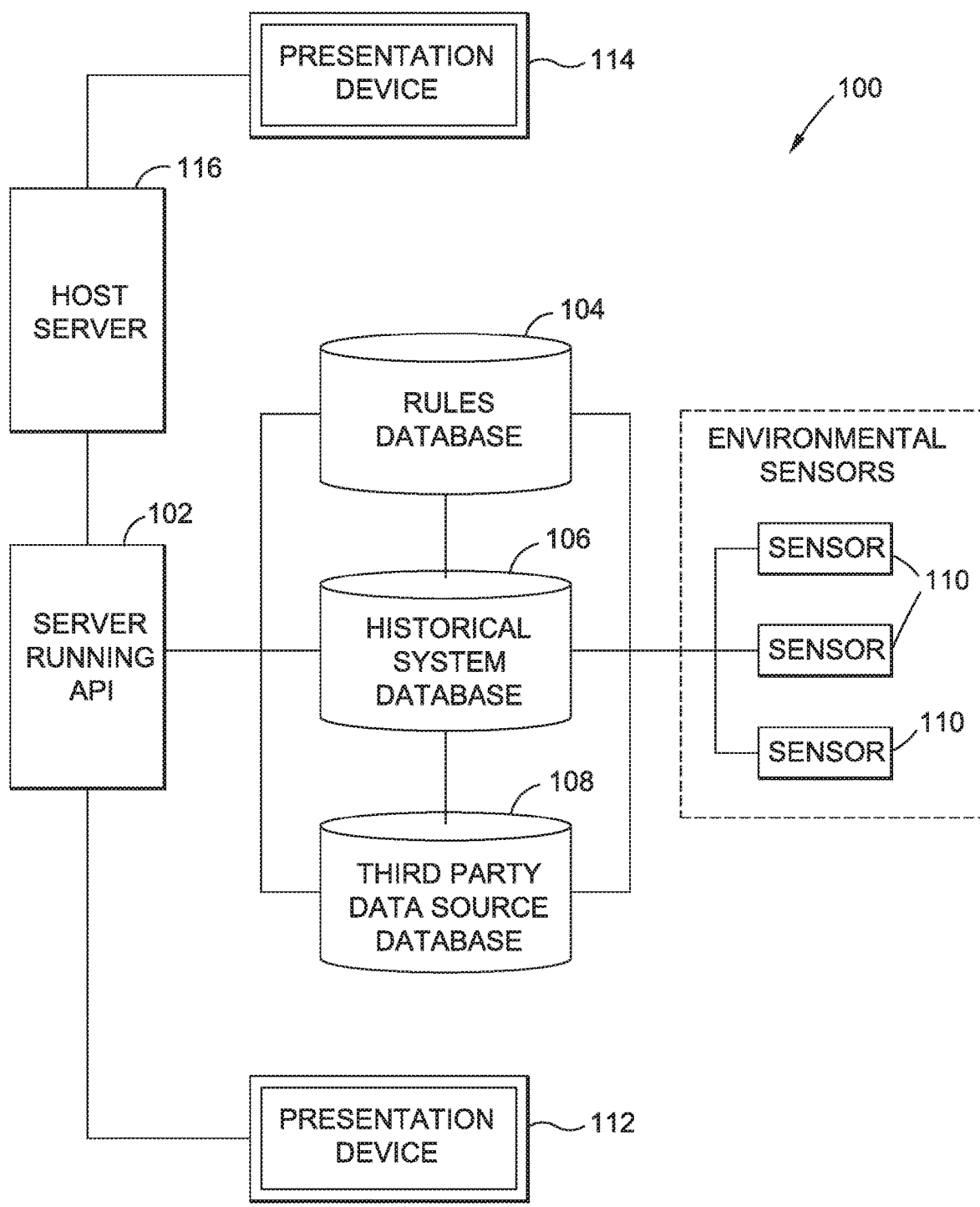
FIG. 1 shows a server-based smart incentive system according to one embodiment of the invention.

FIG. 1 shows a server-based smart incentive system according to one embodiment of the invention. As shown in FIG. 1, a smart incentives system 100 may include a server 102 that hosts a smart rewards systems. The remote server includes one or more processors, memories such and RAM and ROM, and communication ports. The server may store and provide access to a number of application program interfaces with which a number of incentive campaigns, rewards, and other incentives may be created, managed, and distributed.

The server 102 may be connected via a network 140 such as the Internet, a LAN, WAN, or other network to a plurality of information databases. The databases may include a rules database 104 that stores a plurality of rules associated with campaigns, offers, and rewards that may be presented and configured at the server 102. A historical system database 106 may store information resulting from implementation and results of a various campaigns, redemption of rewards, and the like, as will be described in more detail below. Such historical information may be used to improve later developed campaigns.

The server 102 may also be connected to a third party data source database. This database may comprise data from third parties including data concerning client products or services, price data, or other relevant data necessary for created a campaign, reward, or other incentives at the server 102.

The server 102 and databases 104, 106, and 108, may be connected via the network to one or more sensors 110. The sensors 110 may collect information concerning an environment in which a campaign is to be presented. For example, the sensors may include thermometers, humidity sensors, infrared sensors, luminosity sensors, timers, clocks, and the like. Sensors 110 may also include devices to capture demographic information concerning an end user such as microphone or cameras.

The server 102 is configured to present application program interfaces and other tools to a client to create and manage a campaign or other incentive program. The client may access the server via a client presentation device 112 connected to the server 102 via the network. Furthermore, the server 102 may present campaigns, offers, rewards, or other incentives to an end user via a hosting server 116 that relays information to an end user presentation device 114. The presentation devices 112, 114 may be any number of suitable computing devices such as desktops, laptops, and mobile devices such as cell phones and tablet computing devices. The presentation devices 112, 114 may present the content to the client or end user via an application or a web browser running on the presentation devices 112, 114.

It is noted that the system 100 described above is exemplary and other implementations are also considered within the scope of the invention. For example, the databases 104, 106, 108 may be housed on a single device or multiple devices. The server 102 and host server 116 may be incorporated on a single server, or there may be multiple servers connected via the network to implement the system.

The system 100 hosted by the servers 102, 116 and accessed by the clients 112 and users 114 can be considered to have a number of modules that are implemented by hardware, software, or a combination of the two. Such systems include a campaign management portal through which clients may create, administer and manage a campaign. For example, through the campaign management portal, clients may extend offers, and in some instances, extend offers that are customized to specific users or user groups through one or more campaigns. Other systems may include a facilitator application which may be downloaded on a client's or a user's device 112, 114 or may be accessed via a website hosted on the server 102. Further systems include a smart incentive system in which offers and rewards have a plurality of features that may encourage a user to associate higher value with the offers and rewards. Finally, the systems may include an analytics engine whereby offers and the redemption of rewards are tracked and new insights are inferred by system to improve the organization while continually creating increasingly effective offers. Each of these will be discussed in more detail below.

Campaign Management Portal

The campaign management portal provides an interface where clients of the system may login to create, administer, manage, update, and optimize their ongoing campaign efforts. The campaign management portal can be hosted in the cloud, for example on a website hosted by the server 102, or it may be installed by the client locally on a computing device 112, or it can be hosted by any other method generally known to those of skill in the art. The campaign management portal may include a number features that allow the client to manage their ongoing campaign efforts as described below.

Figure 2:
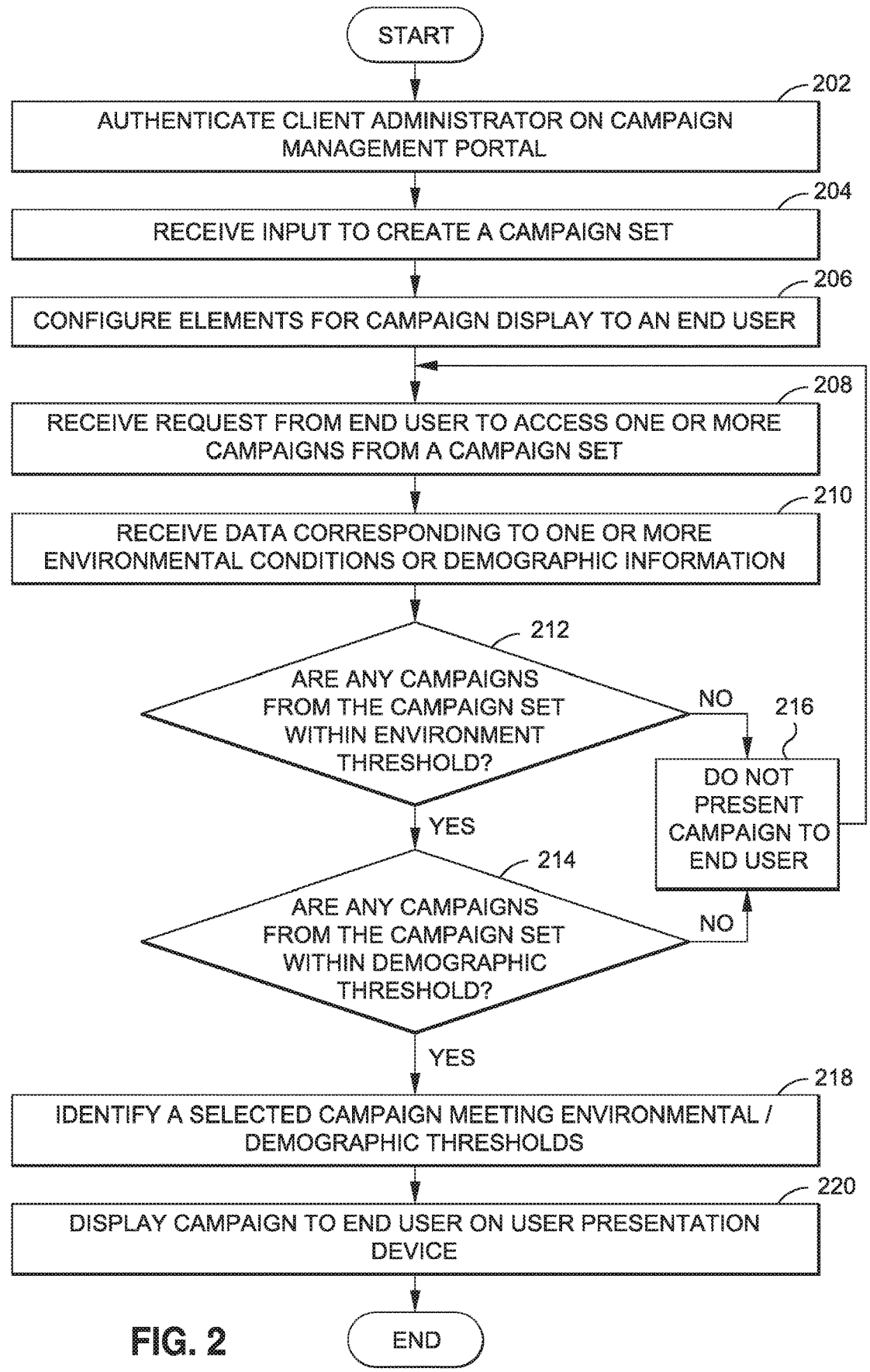
FIG. 2 shows a process of creating and displaying one or more campaigns in a smart incentive system according to one embodiment of the invention.

FIG. 2 is an exemplary method of managing one or more campaigns via the campaign management portal. In step 202, the client or administrator is authenticated on the campaign management portal. The client may access the campaign management portal via a secure user authentication. User account information including passwords may be stored and encrypted on the remote server 102. In one embodiment, an authentication module may use OAuth2 token based authentication. Further, a second method of authentication may also be invoked such as authorization via a secondary device or via biometric data.

Various client accounts may include various roles and permissions for persons accessing the system on behalf of the client. User accounts may be segmented by clients to have associated roles and permissions which allow certain features to be accessible to certain users. Roles and permissions may be altered by system administrators for clients, and for facilitators by client administrators. Roles can allow or deny access to financial information, campaign configuration, analytics reports, user management, PIN management, and other system features.

System administrators may have access to manage client user accounts, manage feature access for individual clients, have access to system logs and error information, and the ability to send and receive notifications and alerts about the system. Via a system administration dashboard, real time data is displayed for administrators of the system in order to monitor errors, usage logs, and potential abuse.

Once the client user has been authenticated, the client may being management by creating a campaign or a set of campaigns in step 204. The campaigns may include various marketing campaigns for different demographic target groups, sales promotions, work incentives, or the like. In step 206, elements for the one or more campaigns in the campaign set are configured to be presented to the end user.

Figure 3:
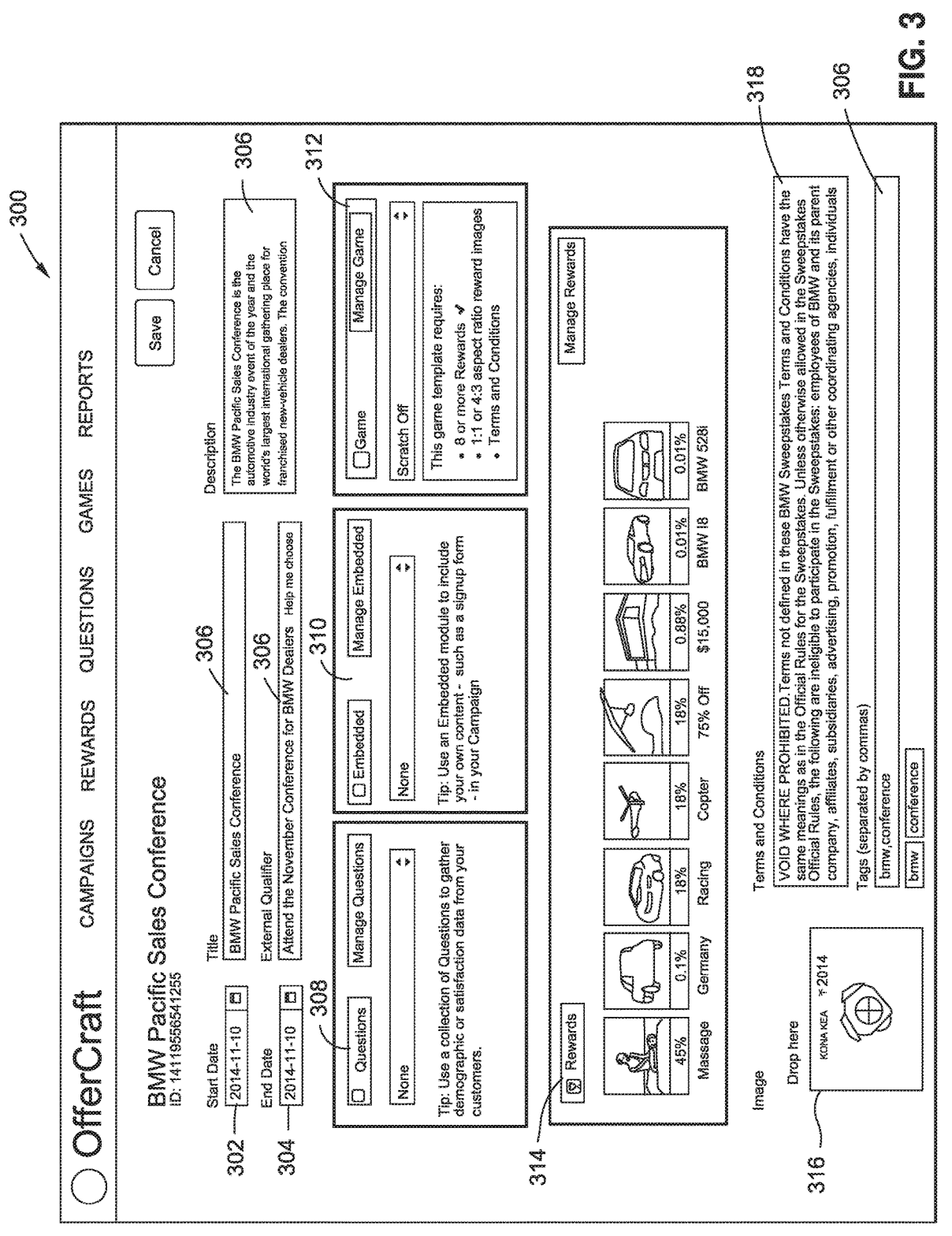

An example of a campaign management portal interface 300 including manageable elements of a campaign is shown in FIG. 3. In some embodiments, the elements of a campaign may include start and end dates 302, 304, various fields 306 to describe the campaign, questions 308 to solicit feedback or to gather demographic information during a campaign, embedded content 310 (such as stored on a third part data source database 108) for adding personalized content to the campaign, games 312, and rewards 314. Additional elements of a campaign may also be manageable via the portal 300 such as a campaign image 316 and terms and conditions 318 governing the campaign. Other aspects of the campaign may also be controlled via portal 300 such as rules for presenting the particular campaign to an end user. Such rules may be based on outcomes of selected questions 308 or games 312, or may also be based on other factors such as detected environment and demographic information.

Figure 4:
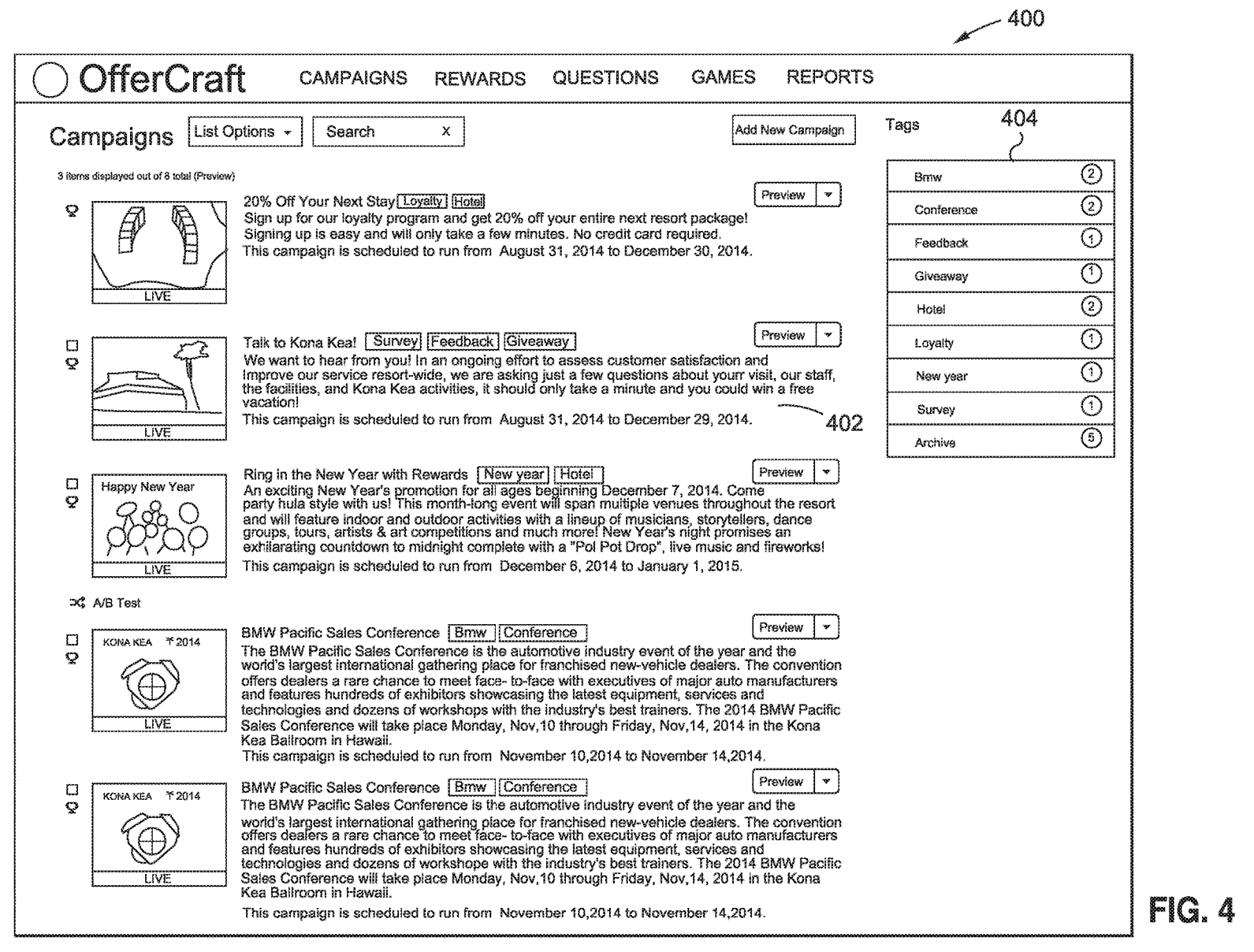

The portal 300 may allow a client to manage multiple campaigns. FIG. 4 shows an example of a campaign management portal interface 400 including a plurality of manageable campaigns. In FIG. 4, one of a plurality of campaigns 402 may be selected to manage as explained above. The campaigns 402 may be categorized or include tags 404 to facilitate organization. Further, the campaigns may be searchable to aid a client to easily find a desired campaign.

As mentioned above, the campaign management portal may manage embedded content from third party sources. An example of a campaign management portal interface 500 for embedding third-party content is shown in FIG. 5. In FIG. 5, various fields 502 may be included to provide a description of the embedded content. An address field 504 may allow a client to input an address, such as a URL, and IP address, or file location on a database, so that the third-party content may be retrieved to be embedded with the campaign.

Figure 6:
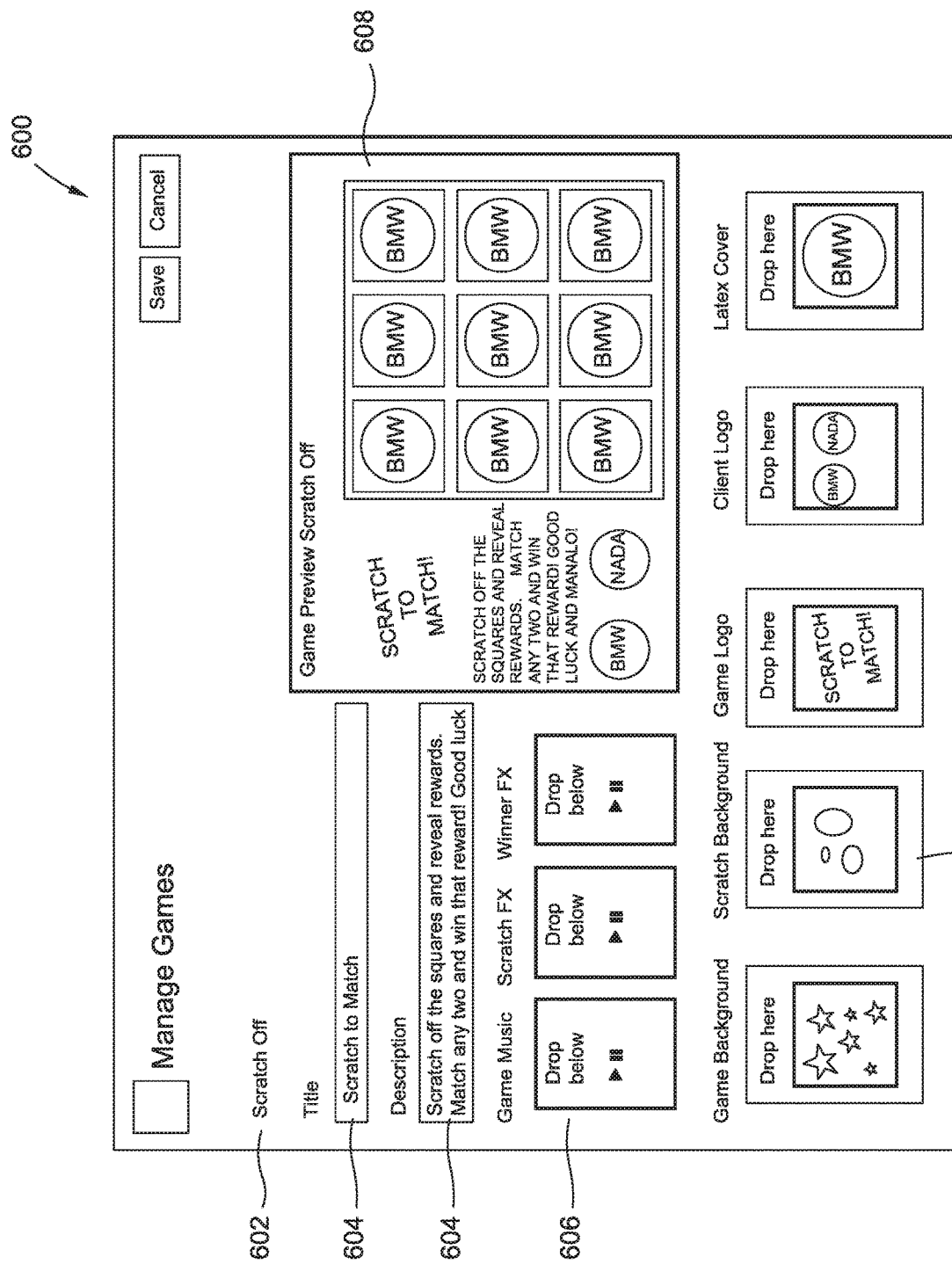
FIG. 6 shows an exemplary application programming interface for managing game content for a campaign in a smart incentive system according to one embodiment of the invention.

An example of a campaign management portal interface 600 for managing one or more games to include in a campaign is shown in FIG. 6. In FIG. 6, a selected title 602 of a game may be managed and customized for a particular campaign. In this example, a "scratch off" game has been selected. A number of fields 604 are provided to customize the title and description of the games. Various game elements 606 such as music, graphics, backgrounds, etc. may also be customized via the interface 600.

A campaign management portal may also include a question bank management interface 700 as shown in FIG. 7. Here, the interface 700 may include a plurality of questions 702 that may be included to be presented to an end user during a campaign. The interface also provides the client with an option to add a new question 704 to the bank of questions. Questions may include one or more tags 706 to allow for categorization. The interface 700 may also include a preview button 708 to allow a client to preview on of the questions 702.

When a question from the interface 700 is selected, or when a new question button 704 is created, the campaign management portal may provide a question editor interface 800, as shown in FIG. 8, to create or edit the question. The question editor interface 800 may include various fields 802 for inputting question text, menus and controls 804 for selecting question types (multiple choice, ratings, select from a group, etc.). Fields 804 may be used to tag and categorize the question to be able to retrieve the question later.

In some embodiments, a campaign management portal may include a question management interface 900 as shown in FIG. 9. The question management interface 900 may allow a user to format one or more questions within a particular campaign. The interface 900 may provide fields 902 to title and provide descriptions of the one or more questions presented. The client may build the one or more questions from a question list 904 having a plurality of available questions 905, such as those created in the question bank management portal interface 900 (FIG. 7). Selected questions 906 may be identified to be provided to the end user during a campaign.

Returning to FIG. 2, once elements for various campaigns have been configured by the client, the process proceeds to step 208. In step 208, a request is received from an end user to access one or campaigns from a campaign set. For example, an end user may access a website, conduct a transaction at a point of sale system, or otherwise be in a position in which one or more campaigns may be presented to the end user.

According to some embodiments, when the end the user is in a position to be presented with one or more campaigns, the system receives data corresponding to one or more environmental conditions or demographic information in step 210. That is, the system may receive information provided by one or more environmental or demographic sensors. Such sensors may include thermometers, humidity sensors, luminosity sensors, clocks, timers, cameras, microphones, infrared cameras, or the like. The sensors provide information concerning an environment of the end user as well as demographic information concerning the end user. In addition to sensors, such information may be input to the system, such as via feedback from the end user or other sources.

In step 212, the system determines whether any active campaigns from the campaign set are within predetermined environmental thresholds. If so, the system also determines whether any active campaigns are within predetermined demographic thresholds in step 214. If either step 212 or 214 results in no campaigns being within the predetermined thresholds, then no campaign is presented to the end user at that time in step 216. The process than returns to step 208 for the next possible presentation of a campaign.

When a campaign is identified within the environmental and demographic thresholds, the system selects a campaign from the set of campaigns based on an ordered hierarchy in step 218. The hierarchy of campaigns may be selected based on any number of criteria. The selected campaign is then displayed to the end user via a user presentation device in step 220.

As an example, one of the campaigns may be for a hot beverage product. The campaign may have predetermined thresholds such as for a given time of day when there is a cool ambient temperature. Further, the particular campaign may target females with an approximate age of 20-35. When the request for a campaign is received, the system may receive temperature information from a thermometer and demographic information via a camera and facial recognition software to determine whether to present the campaign for a hot beverage product to females of the approximate age of 20-35.

Transactional data may be integrated with client financial systems. User behavior over the course of a campaign— such as reward redemptions, time and location data, and associated transactions—may be tracked in real time by the remote server. At regular intervals, this data is exported automatically to separate financial tracking software. The export of the data is managed by a system module that will retry upon failure, and comply with any regulatory financial tracking requirements. The hardware and software for this regular data transport may include queueing modules and multi-threaded runtime environments.

In one embodiment of the campaign management portal, there is an external qualifying code generator. This gives system administrators and client administrators the ability to generate one or several codes that will allow physically "nonqualified" users to participate in a given campaign. This may be necessary in some campaign situations to comply with Sweepstakes Law in various states. The codes may be exported for distribution by the administrator.

In another embodiment, the campaign management portal includes a return on investment calculator. Based on configured reward values, reward allocation ratios, prior redemption rates, and assumed redemption rates, the system can present to the client estimations of ROI given the client's proposed dynamic campaign configuration. With enough prior data in historical aggregation, the system may also provide recommendations on reward and campaign configuration in order to maximize effectiveness. It is particularly beneficial to access the historically aggregated data in an efficient, real-time query; therefore, indexing and data warehousing software modules may be implemented on the remote server.

Reward Management

In some embodiments, the campaign management portal allows clients to manage all aspects of the rewards that are offered during the course of a campaign. For example, cost data including wholesale, retail, and other cost data is stored along with the reward entity on the remote server. In certain embodiments, optional integration with the client's POS or inventory system will keep SKUs and values in sync. Further, initial reward inventory values can be set by administrators in order to ensure allocation of rewards does not exceed physical or virtual inventory. Again, optional integration with the client's POS or inventory system will keep SKUs and values in sync.

The rewards may further be dynamically labeled for the purpose of grouping elements together in reporting and exporting functions. The reward delivery options, that is, the ability to deliver rewards via multiple channels is also configurable on the remote server. Reward configuration can be duplicated using a single push of a button, allowing for similar rewards to be easily and efficiently created.

Figure 10:
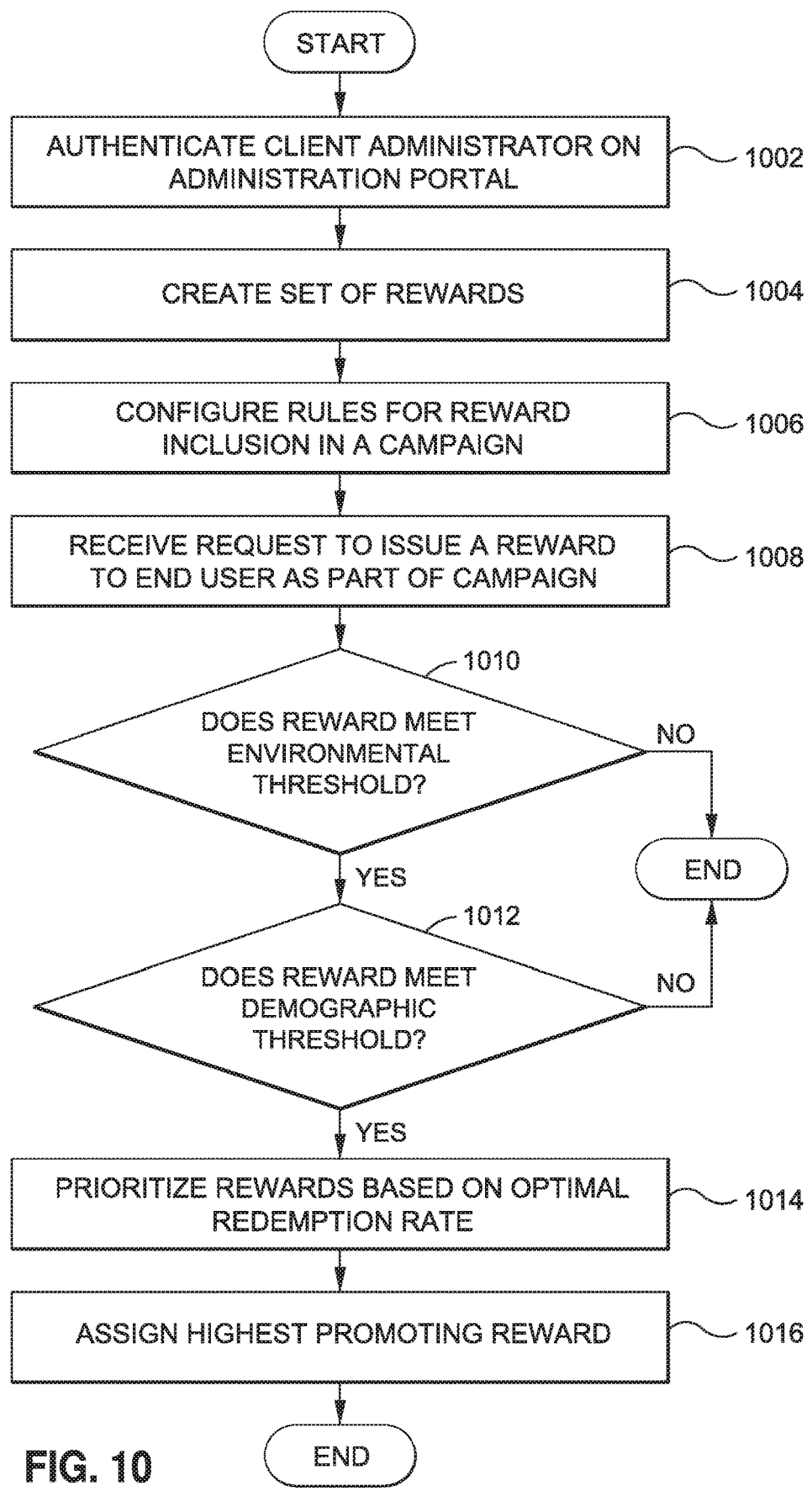
FIG. 10 shows a process of creating and displaying one or more rewards in a smart incentive system according to one embodiment of the invention.
Figure 11:
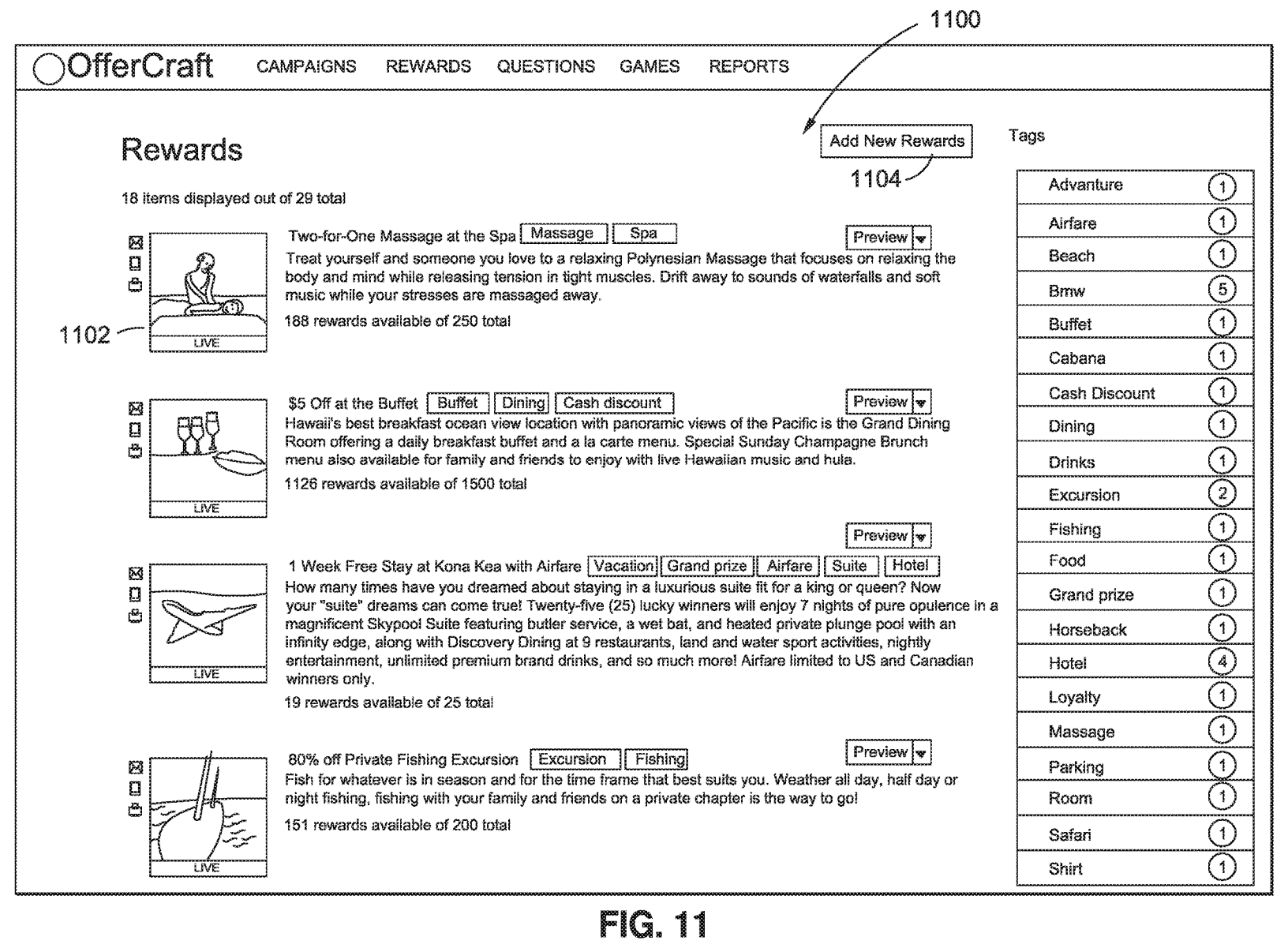

FIG. 10 shows an exemplary process of reward management and presenting a reward to an end user. In step 1002, a client administrator authenticates on the campaign management portal to manage one or more rewards or reward sets. In step 1004, the client creates a set of rewards. An example of a set of rewards in a campaign management portal interface is shown in FIG. 11. In FIG. 11, a plurality of rewards 1102 are listed. The rewards may be used as a part of a campaign. Rewards 1102 may be selected from the interface 1100 for editing. Further, a button 1104 or option for creating new rewards or reward sets is provided in the interface 1100.

Returning to FIG. 10, in step 1006, the system receives input to configure rules for reward inclusion in a campaign. As shown in FIG. 12, the campaign management portal may include an interface 1200 with fields 1202 to describe the reward including name, abbreviate name, description, and the like. The interface may have various rule controllers 1204. Such controls allow the client to dictate how often a reward is presented, when it is presented, the value of the reward, demographic and environmental thresholds for presenting the reward, and the like.

The interface 1200 may further include menus 1206 for delivery options include paper or printed, email, SMS, and the like. Images 1208 may also be associated with a reward. The various rewards to be included in a particular campaign may be managed within one or more campaigns via a campaign reward management interface 1300 as shown in FIG. 13. The campaign reward management interface 1300 includes a list of available rewards 1302 that may be included in a campaign. The selected rewards may be managed in a selected rewards management interface 1304. Here, the selected reward 1306 is shown with either a quantity 1308 or percentage 1310 available for that particular reward in a campaign. In this manner, a client may control the how often different rewards are presented during a given campaign.

Returning to FIG. 10, in step 1008 a request is received to issue a reward to an end user as part of a campaign. In step 1010, the system determines whether rewards in the campaign, if any, meet environmental thresholds. In step 1012, the system determines whether rewards in the campaign, if any, meet demographic thresholds. In steps 1010 and 1012, if no rewards in a campaign meet the thresholds, then no rewards are presented and the process ends. In step 1014, the system prioritizes the rewards meeting the thresholds based on optimal redemption rates as well as other factors and rules set forth as explained above. The highest priority award is then assigned to be presented to the end user in step 1016.

Questions and Games Management

In some embodiments, the campaign management portal allows clients to offer one of the rewards when users answer the above described questions or participate in an interactive activity (such as survey questions, trivia questions, voting questions, personal information questions, point of sale games, etc.) thus enabling the user to feel as though he or she has earned the reward as payment for answering the question(s), participating in a game, or otherwise engaging with the offer in the desired manner through some kind of action. These questions and activities may be managed via the campaign management portal. Questions may be typed (e.g. Multiple Choice, True/False, etc.) and stored on the remote server. Rendering and presentation of the question may be altered based on this typing. For some question types, the remote server will allow the client to predetermine answer choices in order to allow the user to select from a list of options. Rendering and presentation of the question may be altered based on these answer choices.

Certain predetermined questions may be tagged for special treatment by the server, allowing the answers that are provided by the user to be encrypted before being stored, never being stored, or being transmitted automatically to a $3^{rd}$ party system.

Questions may also be dynamically labeled for the purpose of grouping elements together in reporting and exporting functions. On the remote server, question configuration can be duplicated using a single push of a button, allowing for similar questions to be easily and efficiently created.

Campaign Management

The campaign management portal further allows a client to manage general aspects and have overall control of a campaign. For example, the client may place time constraints on a particular reward or campaign by time bounding. In this manner, campaigns may be bound by starting and ending dates or starting and ending times of day, allowing for prior configuration and automated launch.

Campaigns may be linked together by a virtual mapping, allowing certain variables to be tested by random presentation of one campaign against another to a user in an A/B test. The remote server determines the random determination and tracks which campaign was presented to which user, and the subsequent tracking which follows that user to reward redemption.

The campaign management portal allows a client to set and modify reward qualifier definitions. That is, the qualification requirement that must be met by the user may be stored on the remote server and communicated to the user device upon presentation to the user. Additionally, for some qualifications, the system may enforce compliance with the requirement. Further, as with reward and question management, campaigns can be dynamically labeled for the purpose of grouping elements together in reporting and exporting functions.

The campaign management portal further allows a client to manage the manner in which various rewards, and associated events that are part of a campaign are presented to the users. For example, the server 102 may include a randomization engine with configurable allocations for selecting rewards. One or more rewards may be added to a campaign and may be configured to be awarded in any allocation ratio as chosen by the client. The presentation engine of the system handles all variations of the allocation definition. The randomization engine ensures that the allocation requirements are met over time. It is preferable for the randomization engine to assure historical accuracy based on the client's configuration of offer distributions; therefore server-based indexes and tracking modules may be implemented.

The server may further prioritize certain rewards over others, for example, when presented after a game. In some scenarios, the rendering order of rewards is important in the presentation of a game interface, in which case this sequence is stored on the remote server and enforced by the presentation engine.

The campaign management portal similarly manages questions and the formatting of the questions that are selected to be presented to a user. For example, the questions may be optimized for different screen displays. That is, the questions may be rendered differently on different screen sizes and resolutions, while taking into account the question type and the method of user input. The questions may be selected randomly from a subset survey pool. For example, questions may be configured in a collection, and a chosen number of the questions may be randomly selected for presentation by the system.

The campaign management portal further allows a client to set up and manage game configurations that may be incorporated in the presentation of an offer to a user. Such game configurations may be predefined within the campaign management portal, or may be customizable to fit an individual client's preferences. In some embodiments, the game configurations may be customized in real-time depending on the actions of the user. For example, the campaign management portal includes a number of game templates. The game templates may have configurable sound effects, background music, graphic assets, names, descriptions, and logos available for inclusion in campaigns by the client. Games may be configured to be presented sequentially before or after other interactions, and may be either the only or one of many methods within the campaign to determine a reward or reward set for the user.

Game variables are configurable via web browsers and stored on the remote server. In cases where the graphic assets need to be downloaded to a remote device, asset bundles are automatically prepared by the remote server and packaged for efficient transport and version control. It is preferable for a large amount of storage be made available on the remote server to handle the cataloguing and versioning of these graphic assets.

In other embodiments, embedded user interfaces for presenting reward options may be utilized. For example, the campaign management portal may link to a remote URL for an embedded interface. The embedded interface may be a remote interface hosted on remote 3rd party servers and may be referenced in the campaign for later embedding in the presentation to the user. Specific phrases or code may be defined for detection during a user interaction. Divergent actions may be taken based on the detection or nondetection of these phrases, and the requirement of certain user actions may be enforced by these detections.

Transaction identifiers within the embedded content may be detected and stored by the remote server. Certain unique codes and identifiers may be configured for later detection during a user interaction. Divergent actions may be taken based on the detection or nondetection of these codes, and the requirement of certain user actions may be enforced by these detections. For example, if and only if the codes are detected, the user may be given the opportunity to collect a reward or to potentially play a game and then collect a reward.

The campaign management portal may also allow for campaign configuration duplication. On the remote server, campaign configuration can be duplicated using a single push of a button, allowing for similar campaigns to be easily and efficiently created. Campaigns may also be configured to automatically renew based on certain criteria. For example, a client may define certain renewal settings which are stored on the remote server. At predetermined intervals, analysis of previously configured campaigns, and analysis of related usage and reward redemption results are evaluated. Based on the evaluations, campaigns can be set to auto-generate on specific starting dates to be expired on specific ending dates.

Facilitator Application

Once a client has set up a campaign, the campaign may be presented to the user via a facilitator application. The facilitator application may be implemented as hardware, software, or a combination of hardware and software. The facilitator application allows a user to interact with the offers and rewards that are associated with a specific campaign. In one embodiment, the facilitator application may be hosted on the remote server as a website. In other embodiments, the facilitator application may be downloaded to a user's presentation device, such as a mobile phone, tablet computer, or a point of sale system or kiosk accessible by the user.

The facilitator application allows a user to interact with the campaign by viewing presentation of offers, playing games, accepting offers, redeeming rewards, and/or transferring rewards. The server may host the facilitator application as a web based application on a web page or embedded into a client webpage that is accessible by the users. The facilitator application may also be an application that is downloadable from a client or the host server to be installed on a user's device.

Clients accessing the server to interact with the campaign and to manage offers may each have a username and password or PIN code for authenticating the client. Client account passwords and or PIN codes are preferably encrypted on the remote server. Client authorization using account credentials may be completed via any suitable standard or proprietary authorization protocol such as OAuth 2.0.

The facilitator application may collect other user information upon authorizing a client. For example external qualifiers may be collected by the application. This may be done through an interface that is provided for the facilitator to verify that the client meets external qualification criteria, and to send specific validation of this to the remote server for storage and audit logging.

The facilitator application may also collect a receipt image of a transaction that may be captured directly from the client's device or other device on which the application is installed or running. The receipt image is captured using the native hardware of the client device, including but not limited to front-facing and back-facing cameras. The receipt image may be sent to the remote server for storage and/or future processing.

The facilitator application allows the client's campaign to be presented to the user. Based on the client's campaign configuration via the campaign management portal described above, the facilitator obtains a presentation configuration from the remote server. The facilitator devices may call API services in order to recall active campaigns. Campaigns that are associated with A/B tests are randomly selected for display on the facilitator device based on a randomization process. When necessary, opt-in interfaces, terms acceptance interfaces, and disclosure text is rendered on the facilitator device and governed by data from the remote server.

The facilitator application may display questions and collect answers based on the information received from the server. Questions and possible answers are transmitted from the remote server in a serialized format to the device for appropriate rendering to the user. Questions may be required or optional. Responses to the questions are transmitted to the remote server. Some responses may be flagged as "personally identifiable information" and the text may be treated differently upon collection stored in an encrypted state or securely transmitted to the client's customer relationship management system.

The facilitator application may display and enable embedded interfaces. User interfaces that reside on $3^{rd}$ party remote servers 108 are referenced via URL and embedded within interface provided to the user. Both the local servers 102, 104, 106 and the $3^{rd}$ party servers 108 may provide content to the interface. Client side code detects user actions within the embedded $3^{rd}$ party interface and makes subsequent actions based on user behaviors. Additionally, data that is transmitted to the client from $3^{rd}$ party embedded interfaces can be intercepted and transmitted back to our remote server. This information (e.g. new membership IDs, eCommerce transaction IDs) can be used to validate a desired user behavior and/or used as a logging trail for financial audit.

The facilitator application may also display interactive games. For example, various game interfaces may be invoked on the user's device, with customized graphic assets provided by the remote server. Configuration of the game interface's variables (e.g. animation speed, velocity multipliers, sprite behavior, etc.) may be controlled on the remote server. The outcome of the game may be predetermined by a reward determination engine, in which case the mechanics of the game are visualized in such a way as to display the winning value in a dynamic way in concert with the variable user actions of the interface. Graphic assets, sound effects, and reward determination algorithms may be configurable via the remote server.

The facilitator application may incorporate photo capture at the computing device. An interface to invoke the device camera is optionally made available during the user interaction in order to capture a photo of the user. The user image is captured using the native hardware of the client device, including but not limited to front-facing and back-facing cameras. This photo may be shared with the client via an automatic upload at the completion of the interaction, or shared with the user's social media network via additional interfaces made available on the application.

Further, the facilitator application allows for payment processing. The facilitator application may conduct transactions to process a payment from the user either before or after their interaction with the campaign.

Rewards Presentation

The server may include a rewards determination engine to create the hierarchy of rewards (step 1014, FIG. 10) to determine which reward to offer to a user. The rewards determination engine draws on a number of sources to determine an offer for a particular user. The reward determination engine may evaluate the client's reward allocation configuration as set up by the campaign management portal, may employ random number generation, and may use information from predictive analytic engines to determine a reward for each instance of a user interaction. Such analytics will be described in more detail below.

Instead of using the reward determination engine, the server may also deliver rewards based on pre-determined outcomes, using simulated chance. In this way, the user may engage with an offer and in some cases a game, questionnaire or another interactive activity where the client has already selected a pre-determined reward using our system.

The reward may be presented to the user by the facilitator application in a number of ways. The user may choose how the reward is delivered. For example, the reward may be delivered to a user's email address. Here, the reward may include text, images, eligibility, and terms packaged in a plain text or HTML enhanced email and is sent from a queue to an SMTP processor for intended delivery to the user. The email queueing system may manage delivery rejections and system errors to ensure that the reward is delivered.

The reward may also be delivered via SMS. Here, abbreviated reward text and a link to a web application or a website that renders the full reward is packaged in a string and sent from a queue to an integrated SMS relay processor for delivery to the user. The SMS queueing may manage delivery rejections and systems errors to ensure that the reward is delivered.

Further, the reward may be delivered via a printer. The reward may be offered to a user by being displayed on a tablet, kiosk, or browser. The remote server may then provide an interface to invoke the native printing function of the device to print the offer.

The reward may also be presented via a displayable widget. The widget may be displayed via a website, via a native application installed on a user's personal computing device such as a mobile phone, or via a social network integrated module within a social media platform. A widget may be embedded on the web site or application that includes a predefined interface or that may communicate with the server to render a set of data representing the resultant reward to the user. A similar widget may also be integrated within a social media platform that is associated with the user's unique identifier. The reward may then be displayed within a social media environment.

The reward may also be presented to a 3rd-party software program via a secure Application Programming Interface provided by the remote server. The results may be integrated and displayed via a 3rd-party website, via a 3rd-party native application installed on a user's personal computing device such as a mobile phone, or via a 3rd-party social network integrated module within a social media platform.

Reward Redemption

The facilitator application may also facilitate the redemption of the rewards by the user. The facilitator application may utilize a camera of the user or client device as a QR code scanner/manual code entry device. The interface allows for access to the device's camera in order to scan QR codes in real time. The QR codes may represent the unique identifier of the reward. A manual text input box is also be available in order to communicate the alphanumeric string to the remote server. The remote server interprets the QR code and translates it into an alphanumeric string. The alphanumeric string is looked up and validated against several eligibility factors. Possible states of the code are: unredeemed and valid for single redemption, unredeemed and valid as part of multiple redemptions, unredeemed and invalid due to contextual restrictions (date, time, day of week, etc.), already fully redeemed and invalid, nonexistent, malformed.

The unique code that represents the reward can also be communicated to the redemption device by wireless methods such as Near Field Communication protocol, Bluetooth protocol, unique sound identification, and similar protocols. If the user opts in to allow such scanning, the code could also be looked up on the remote server based on biometric identification or unique identifier manual entry.

When an offer is redeemed, the facilitator application provides mapping of the promotional campaign internal code to a point of sale bar code. The remote server maintains a one-to-one mapping of the campaign's unique identifiers based on the definition of the reward on the remote server to the bar code needed for scanning on the local point of sale system to represent the same discount. Additionally, the facilitator application incorporates receipt image capture that captures images directly from the device and sends the images to the remote server for storage and future processing.

Smart Rewards

Embodiments of the rewards systems allows clients running a campaign to offer "smart" rewards to users, as opposed to typical offers such as a promotional paper coupon or voucher. Such "smart" rewards have dynamic features that are controlled by the remote server as opposed to such static prior rewards. In some embodiments, the "smart" rewards are customized to a particular user, user group or other unique criteria (such as the time of day or season).

The smart rewards may be rendered in email, a web app, or an integrated web/native widget. Either the offer or the reward receipt itself can be delivered to the user via multiple media channels. Clients can then continue to interact with the user through the preferred channel selected by the user. Examples of the media channels used to render and deliver the interactive offers and rewards are: email, SMS messages, mobile and traditional websites, native mobile apps and desktop applications, social media channels, virtual reality platforms, and traditional paper/print. The results are rewards and offers that can be viewed and used on computers, kiosks, mobile phones, tablets, televisions, radio, gaming platforms, virtual and augmented reality platforms, digital signage, printed paper, and more.

Data and metadata associated with the individual instance of the reward unique by user, client, campaign, and date is stored on the remote server. When rendering of the reward is required upon initial distribution, subsequent lookups, and user actions such as trading and sharing appropriate technologies may be used to display the data. For rendering within a browser on tablets/kiosks/desktops, HTML5, CSS, and JavaScript may be employed. For rendering in native mobile applications, native user interface elements may be employed. For rendering in SMS, text will be used to redirect the user to a mobile optimized web application rendering of the reward.

The smart rewards may have dynamic validation and expiration terms that can be adjusted by the client in the campaign management portal. In some embodiments, this feature allows the client (i.e. the system user) to set specific parameters around how a reward receipt can be validated when it either expires or when it is redeemed by a user. The system tracks which rewards have been redeemed and what has expired for both general reporting purposes and to draw inferences about larger business and offer performance issues.

Reward instances may be stored on the server with expiration dates and other optional limiting parameters. In some embodiments, upon a redemption attempt, the client device will communicate with the server to determine whether or not the reward is valid, given the eligibility dates and other comparisons between those limiting parameters and the context of the redemption. The server will allow/disallow redemption, and upon successful redemption will increment the number of successful redemptions.

In certain embodiments, the smart rewards can be configured to be both single-use and/or multiple-use rewards. A reward can be set up in the system by clients to be used only once, or it can be set to be used multiple times before it invalidates itself. This means that users could potentially get a reward that can be redeemed only once, or one that could be reused several times, or even one that could be used indefinitely. In some embodiments, the system allows these rules to be changed at will, and generates reports analyzing the effects of single-use vs. multi-use campaigns.

The number of redemptions of a given offer may vary based on the configuration of individual rewards within a campaign. If single use, the first successful redemption will render all future redemption attempts invalid. If multiple use, the reward will remain redeemable until the number of redemptions configured equals the number of successful attempts. In some embodiments, the governance of the reward's eligibility is the responsibility of the server based logic engine.

The smart rewards may further have the dynamic characteristic that allows a user to choose a reward or aspects of the reward. In other words, rather than presenting a single predetermined reward to a user, the client can present the user with a range of awards, usually grouped into a tier of similar value items, so that a user can select the most appealing reward from among multiple options. These groups can be created manually, or the system's artificial intelligence can automatically group rewards based on variables such as actual value, geographic area, time sensitive events, personal preferences, and the like.

When the user chooses a specific reward, the psychological bond between the user and the reward he or she ultimately selects is boosted. This thus increases the chances of the offer eventually being redeemed. The element of choice can happen at multiple points throughout the presentation of the offer. For example, users can choose what kind of offer they want to initially try to earn, what kind of reward they want to get after earning the reward, or even what kind of reward they want to trade their initial reward for if they prefer something else at a later stage.

Mappings between equivalent value rewards or potentially equivalent rewards may be stored on the remote server. Upon request, the server delivers a set of rewards from which the user may choose. Reward inventory counts and eligible future reward options may be affected by the user's choice.

Figure 14:
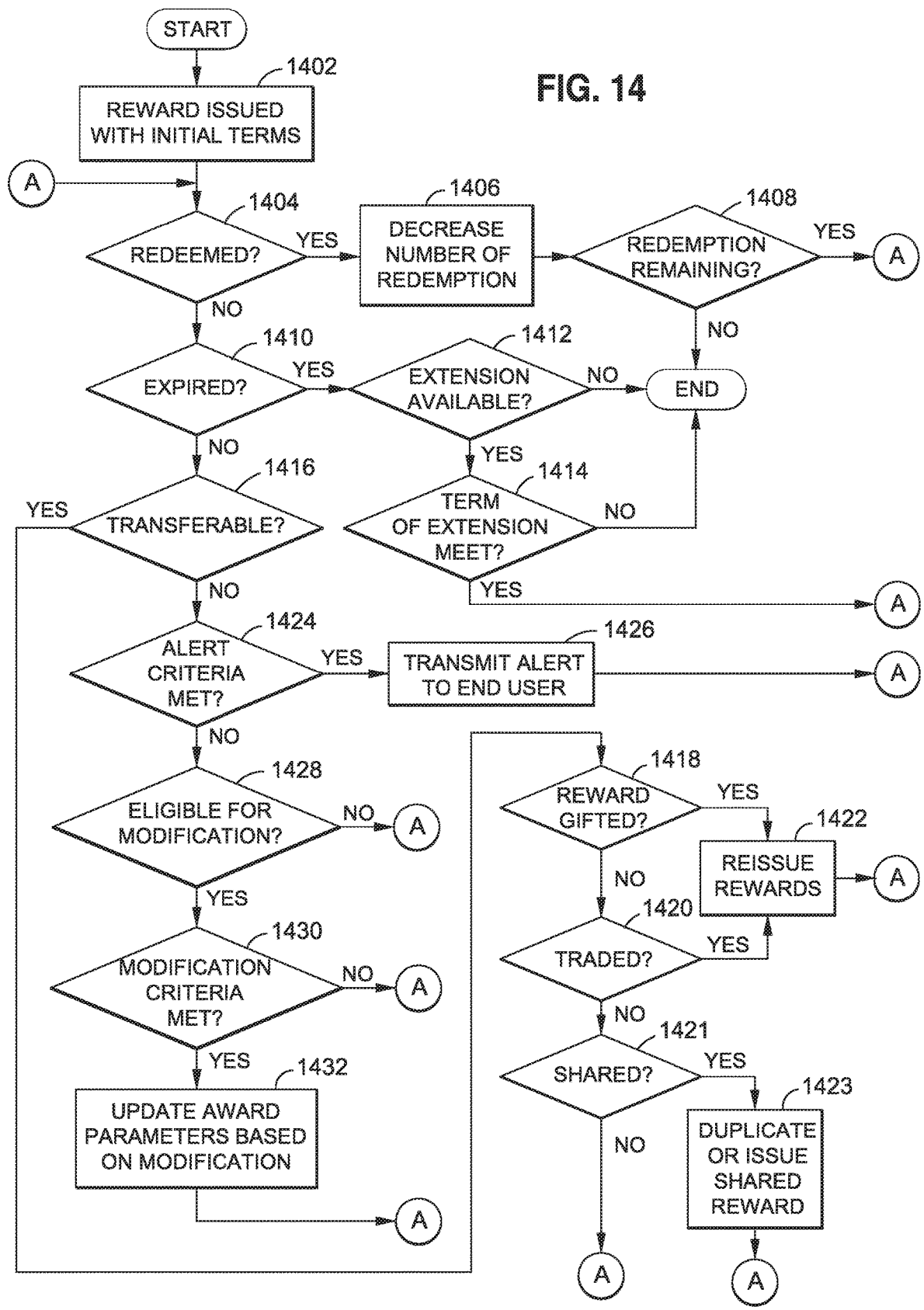
FIG. 14 shows a process of issuing and tracking smart rewards in a smart incentive system according to one embodiment of the invention.

An exemplary method of issuing and tracking the life style of one of the above described smart rewards is shown in FIG. 14. In FIG. 14, a reward is issued to an end user with initial terms. For example, a reward may have terms such as a given expiration date, redemption terms, number of redemptions, time and place restrictions on use, and the like. The reward may be issued as described above as part of a campaign in response to a question or as a result of game by played by the end user. The end user may choose the particular smart reward out of a number of offered smart rewards. In this embodiment, the smart reward is uniquely identified to track the life of the smart reward.

In step 1404, the system monitors whether the smart reward is redeemed by the user. For example, when the reward is used to receive a discount on goods or services, the uniquely identified reward is captured and the identity of the redeemed reward is reported to the smart rewards system. When the reward is redeemed, the number of available redemptions for the reward is decreased in step 1406. In step 1408, it is determined whether any remaining redemptions are available for the reward. For a single use reward, the remaining redemptions would be zero and the process ends. However, if there are more redemptions remaining for the reward in a multiple-use reward, then the process returns to step 1404.

The system further monitors smart rewards to determine whether a given reward is expired in step 1410. When the reward expires, the process proceeds to step 1412 where it is determined whether an extension of the expiration is available. A client may configure the reward to encourage a user to redeem the reward by offering an extension of the expiration date. In step 1414, the system determines whether terms of the extension have been met in order to grant the extension of the expiration date. For example, the system may prompt the user to answer an additional question, to participate in a game, or to complete some other task to obtain the extension of the reward. When the expiration date is successfully extended, the process again returns to step 1404. If no extension is obtained as result of step 1414, then the process ends.

In step 1416, the system monitors rewards configured with the option to be transferable. In the smart rewards systems, rewards may be configured to be swapped with the issuing organization for another reward, to be exchanged with other users, or to be shared with additional users. If a reward is so configured, the process proceeds to step 1418. In step 1418, the system monitors whether a user gifts the reward. When a reward is gifted, the system reissues the reward to the new user in step 1422, and the process then returns to step 1404. Similarly, the system also monitors whether the reward is traded in step 1420. The trading of the reward may be with the institution that issued the reward, or may be with a separate user. As before, when the reward is traded, the system reissues the traded rewards to the new users and the process then returns to step 1404.

In step 1421, the system determines whether the reward is shared. Sharing rewards may be done by posting a reward on social media, sharing via email, SMS messaging, or other means. The reward may be configured such that the original award may share multiple redemptions with other users, or that the reward may be duplicated to the other users. When the reward is shared, the system duplicates or issues the shared rewards in step 1423. The process then proceeds again to step 1404.

When the reward is delivered to a user via electronic means, such as via email, SMS messaging, an application, or the like, the reward may also be configured to allow alerts to be sent to the reward holder. Such alerts may include warnings of an upcoming expiration dates, reminders to redeem the offer, messages to participate in additional offers, encouragement to share or swap the offer, or the like. The system determines whether one or more criteria is met to send an alert to the holder of the smart reward in step 1424. If the criteria is met, then the alert is transmitting to the end user in step 1426. The process then again returns to step 1404.

Smart rewards may be configured to be modified over time in order to encourage redemption of the rewards, and to increase the rewards' effectiveness. The rewards may be modified based on input by the institution that issued the reward, or may be modified based on criteria predetermined at issuance. In step 1428, the system determines whether the smart reward has been configured to be eligible for modification. If not, the process returns to step 1404. If the reward is eligible, then the process proceeds to step 1430. In step 1430, it is determined whether one or more criteria is met to modify terms of the reward. For example, the reward may be configured to present an additional game to the user which upon completion, increases the number of redemptions of the reward. As another example, the reward may offer an increase in the value of the reward when the end user shares the reward via social media. Any other number of criteria that may or may not require action by the end user may be applied to modify one or more terms of the reward.

When the modification criteria are met, the system updates the reward parameters based on the modification. In the examples above, this may be by increase the value or the number of redemptions. Other possibilities include allowing the reward to be transferred or swapped for an additional reward, extending an expiration date, or the like. Once the parameters are updated, then the process returns to step 1404.

In some embodiments, the "smart rewards" also include "evolving rewards." That is, rewards that become customized to the user and thereby become increasingly effective over time. As a user chooses and/or redeems offers over a period of time, the system begins learning the preferences of the user, and can be set to revise the type of offers and type of rewards that the user sees. The system may take into account many different variables ranging from individual preferences, to preferences of other users at one geographic area versus another, to how preferences change over time each year, to what else is being purchased or what other activity is being incentivized when the offer is presented or redeemed, to how frequently the user participates, to other behavioral and demographic characteristics that can be collected outside of our system but fed back into it for analytic purposes.

The system of "smart rewards" thus presents a user with increasingly effective incentives offers and rewards that are increasingly likely to inspire the desired behavior. In certain embodiments, these rewards can be created entirely by the client without regard to the system recommendations. Alternatively, the system can generate analysis of the client's desired rewards and make recommendations for suggested changes. Even further, the system's artificial intelligence may generate its own recommended rewards that the client can then simply approve.

In some embodiments, data about the user can be collected from many sources, including but not limited to: integrated point of sale systems, data integrations with client loyalty or CRM systems, and history of user actions and inaction based on data received at the remote server from the facilitator application. Algorithms evaluate specific usage patterns of the user and of other users that match the user's segmentation.

The smart offers may also be presented along with dynamic multi-media such as multiple images/angles, text, and video. Thus, rather than presenting offers and reward receipts as static text, images or simple videos, the system allows clients to either manually create or automatically generate more interactive rewards and offers that incorporate more sophisticated multimedia effects such as: dynamic video, highlighting imagery from multiple angles, incorporating sound effects and vibration and lighting effects using the user's device, and the like.

Graphic media and assets may be stored on remote servers and content delivery networks. Assets may be managed by clients within the campaign management portal and may be called upon for rendering on demand.

Rules Engine

The smart rewards and the dynamic features associated with the smart rewards are controlled by a rules engine implemented on the remote server 102. The reward rules engine allows the client to tell the system how to react to specific user behavior. The client can either manually select from a series of "if X occurs, then the system should do Y" or allow the artificial intelligence governing the system to make decisions like this on its own as determined by preprogrammed logic and input from the specific client's preferences.

Examples of rules engine governed rewards include: the ability to present one or more offers based on one or more predetermined factors; the ability to let users trade rewards with each other or with the client to find their preferred reward; the ability to let users choose from multiple reward choices when first selecting their reward; the ability to send follow-up messages; the ability to send follow-up rewards & offers; the ability to allow users to share or gift rewards to each other; the ability to utilize group-focused offers and rewards that require multiple users to either compete with each other or cooperate with each other to qualify for an offer or redeem a reward; the ability to deploy rewards that dynamically change in value depending on rules set by the client; the ability to deploy delayed-reveal rewards that only reveal their worth upon redemption or upon the user completing a specific action; the ability to send expiration reminders; the ability to use two-way communication between the client and the user; the ability to consolidate multiple lower value rewards into a higher value reward; the ability to include time and location-sensitive incentives such as a reward that changes in value over time unless certain actions are taken (like completing a specific action or redeeming a reward); the ability to deploy conditional rewards; and the ability to send usage notifications, among other messages and reward types. These rule features are discussed below in more detail.

Rules-based award presentation: In some embodiments, clients may set up a plurality of offers or awards for presentation to end users. The rules engine may select one of the offers or rewards to present to a user based on a plurality of factors. These factors may be equally or unequally weighted according to client preferences or based on analytics reports, described in more detail below. A client offer or reward presentation device may include sensors to monitor conditions that correspond to factors used in determining which offer or reward to present. Such factors may including a time of day, week, month, or year; a current temperature; a likely demographic of a detected user; a number of potential detected users; an amount of traffic in a nearby area; past performance of certain offers in similar conditions; performance of offers and rewards at other clients; etc. Each factor is assigned a weight or score, and by considering these and other facts, the rules engine may select one of the plurality of offers or rewards to present to the end user at a given moment in time.

Trading rewards: In certain embodiments, Clients can choose to make rewards eligible for trade with the client company or among users. This way, if a user is unhappy with the reward received or would prefer something else, she can trade in her reward for another reward (usually, but not necessarily, of similar value.) These trades can occur among users or between a user and the original client. This helps the user to obtain a reward that is more likely to spark the desired final behavior, and also reveals user preferences for one reward versus another, which the analytics system (described below) uses to draw inferences about the rest of the business operations and to create more effective offers and rewards in the future.

Multiple Choice Rewards: Rather than receiving a specific reward pre-selected by the system, certain embodiments allow users to select their preferred reward from among multiple options, generally presented as several choices from a tier of similarly valued rewards within a predetermined tier level. This increases the psychological bond between the user and the reward, boosting the chances that the user likes the reward, remembers it, and ultimately redeems it.

Follow-up messages: Follow-up messages and offers may be based on different user behavior. For example, if a user decides to redeem an award within hours of receiving it, that could prompt a very different message as compared to someone who redeems the reward after six months. In another example, if a user gives his reward to someone else, that could prompt a different message than someone who uses it herself. Or if another user only redeems rewards on Fridays, this could prompt a message highlighting upcoming events for subsequent Fridays. In some embodiments, messages can be varied based on factors such as geography, items purchased, time, demographic knowledge, and many other such variables. These automated messages create a more personalized experience for end users and save time and effort for the clients (system users).

Follow-up rewards/offers: Similar to the example above, the system can provide another follow-up offer or reward to the user once he or she actually redeems the initial reward. Like behavior-based messaging, these offers and rewards can be predetermined and varied in a number of ways. For example, follow-up offers may be based on usage, time, location, geography, actual spending, and so forth. The follow-up offer may be automatically delivered once a user triggers the follow-up reward/offer by behaving in the targeted manner. Another type of follow-up reward the system can offer are sequential rewards. These allow a client to outline ahead of time what the follow-up rewards/offers are going to be. The first reward might be for, say, 5% off. If redeemed, a second reward could be unlocked for 10%, followed by 15% off, and so on up to a final reward. The user can be told to redeem each reward along the way; and that redeeming a reward subsequently unlocks the next level reward.

Sharing functionality: In some embodiments, clients can use the system to allow rewards to be shared by users either in a one-to-one capacity for direct exchange or mutual benefit. Rewards can be gifted or shared with another specific person, or they can be gifted to another random user. It also allows sharing in a one-to-many style for more social/viral sharing. In other words, rewards can be gifted from one user to another so that only the new recipient(s) can redeem the offer, or they can be set to be used by both the original user along with a predetermined number of additional users invited by the user to also enjoy the reward. This allows a user to potentially post up his offer on social media or send it to several friends and indicate something such as "the first ten people to redeem the reward will also be able to share the same benefit of the reward." The system tracks the sharing, identifies "super users" who spread the offers most effectively, and draws conclusions about how to increase the number of super users and utilize the best practice tactics they are employing in other efforts elsewhere in the system. All of the sharing functionality described above may be accomplished, for example, by email, by SMS, by Bluetooth, by NFC, via social media, and the like.

Group-oriented competitive or cooperative offers and rewards: the system can be set to require users to either compete with each other to achieve certain rewards, or cooperate with each other to complete certain actions together to qualify for or redeem a reward. For example, an offer might say that as long as a group of several users redeem their rewards together within a certain time frame, it would unlock a secondary level reward that all of them would then receive. In another example, an offer might say that whoever redeems a reward first among a specific group would get a better offer while the last person to redeem might receive the smallest reward.

Rewards that dynamically change in value: The system can be set up to allow for rewards to temporarily change in value depending on the rules outlined initially by the client. For example, if a user receives a reward for a two-for-one special off any subsequent visit, that reward could be manually or automatically set to increase in value to a three-for-one special during a particularly slow time in the middle of the week, or during a unique occasion when the client is trying to boost redemption.

Delayed-reveal rewards: rewards can be set up in the system to either immediately reveal their value, or to only reveal their value at a future time, such as upon redemption or at a predetermined future time, or upon the user completing a specific follow-up action. This allows the client to decide when the most opportune time is to reveal the worth of the reward that the user has received. For example, a user may receive a reward that could be either somewhat small or very significant, but would not know until showing up for their appointment, or making the purchase, or whatever the organization is trying to incentivize users to do; or a user could receive a reward that doesn't reveal its value until a month in the future; or a user could receive a reward that doesn't reveal its value until the user answers a specific survey question, etc.

Expiration reminders: prior to an offer expiring, one or more messages can be sent to the user via the preselected media channel to remind them that they only have a limited amount of time remaining to redeem the reward. This can be paired with the dynamically changing rewards (#84) so that the reward can be changed to try to increase the likelihood of redemption.

Two-way communication: After a user receives a message or reward, he can respond to it if the client chooses to allow this. The system can either allow clients to send out manual responses, or the system's artificial intelligence can interpret the language used by the user to create customized auto responses, or a combination of both approaches can be used.

Consolidating (or redistributing) rewards: the system can be set up to allow users to consolidate multiple lower value rewards to exchange them for a different, higher value reward that has similar or different redemption rules. On the flip side, the system can allow large rewards to be broken up into multiple lower value rewards if the client wants to make such an option available.

Time-sensitive & location-sensitive rewards: in some embodiments, the system can be set to create either time-based rewards, location-based rewards, or both. For example, a user might receive a reward that shrinks in value over time—such as very visibly decreasing in value by 10% each day over a week—to encourage faster redemption. In this scenario, the system can optionally be further set up to allow a user to complete a specific additional task—like registering for a loyalty club or answering a survey question—to boost the value back up to its original worth. An example of a time and location-based reward combination might be a reward that requires a user to visit multiple stores or offices within 24 hours in order to unlock the full value of the reward.

Conditional rewards: in certain embodiments, the system can allow for a reward to be given that requires secondary action(s) to be taken by the user before it may be used. For example, a health plan or health provider might distribute a specific reward like money or a free item that requires the patient to complete a follow-up exam or multiple exams before the reward can be redeemed.

Usage notifications: Notifications can be delivered to both the user and the client to let them know when and how a particular reward has been used. These can also be collected and reported in multiple different ways.

In some embodiments, every instance of a delivered smart reward is tracked uniquely as compared to all other rewards. For example, for each reward, the user to whom the reward is offered, the campaign from which the offer originated, the reward identified in the offer, the terms of the offer, the date issued, and the expiration date may be uniquely tracked. The unique instance is represented by an encoded symbolic image, such as a QR (Quick Response) code. This code can be interpreted by the remote server and evaluated in its component data parts. This can also include a direct mapping to a bar code for utilization by the client's point of sale system, and aid in efficient redemption validation.

It is further noted that each smart reward is not limited to incorporating a single feature. More than one feature up to and including all features may be implemented in a smart reward. The features may be combined based on preferences of a client for a given offer or campaign.

Analytics, Machine Learning & Artificial Intelligence System

In some embodiments, the smart rewards system also includes an analytics and artificial intelligence system that analyzes the user's actions to both report on and draw inferences about how best to improve offer and reward effectiveness.

First, the system performs ongoing background analysis for tracking the progress of an ongoing promotional campaign and auto-generating monthly reports. The system also provides the ability to run custom queries at any time. The client can export this data to another system, or can use the system to see a creative, visual reporting of user data to help the client make better decisions based on the performance of past and current offers running in the system. The data can be queried in many different ways to analyze performance across a multitude of metrics including: time, geography, products purchased, actions taken, type of user, satisfaction, frequency of transaction, and more. The data from an individual client can also be compared to blinded group data compiled from other clients in the system. This allows a client to compare his or her performance to other larger data sets that compile performance data from many clients across industry vertical, geography, etc.

In addition to tracking and reporting, the system includes an artificial intelligence system that draws inferences from the incoming performance data to actively make suggestions about and/or actually adjust the current and future offers with the goal of improving their effectiveness as initially defined by the client. The system is able to either make these adjustments on its own without client approval, or manually with client approval.

In other words, in certain embodiments, the analytics engine may be essentially set to "autopilot" in order to test out different offer combinations. Or the system can be set up so that as a client creates a new offer, the system is able to assess the predicted effectiveness of the offer to help the client decide whether or not to publish a given offer or set of offers.

In some embodiments, the effectiveness of these features relies on past performance data from clients individually and the larger database of collected data across all clients. In certain embodiments, the system becomes more effective as it gathers more data.

The machine learning algorithms use both supervised and unsupervised approaches. Techniques include: decision-tree learning, clustering algorithms, Bayesian network analysis, association rule learning, artificial neural networks and genetic algorithms, similarity learning algorithms, support vector machines, agent-based modeling, and both reinforcement and representation learning algorithms.

Second, the system has been architected to deliver reports and recommendations not only to make the offers themselves more effective, but to allow the data to be easily merged with larger data sets gathered wholly or partially outside the system. This allows clients to use the system to both better assess how offers impact other parts of their business, and also to improve the effectiveness of the system's machine learning approaches.

Third, in certain embodiments basic real-time reports are also available at any time to system administrators and client administrators. Such reports may include campaign usage (e.g., number of campaign transactions), reward usage (e.g. number of rewards delivered and/or number of rewards redeemed), question usage (e.g. aggregated answers and/or individual answers), embedded module usage (aggregated results), and game usage (actual game outcome vs. pre-configured reward allocation). All such reports may be available for exporting to a variety of formats including XML, CSV, or a custom format.

Implementation

Figure 17:
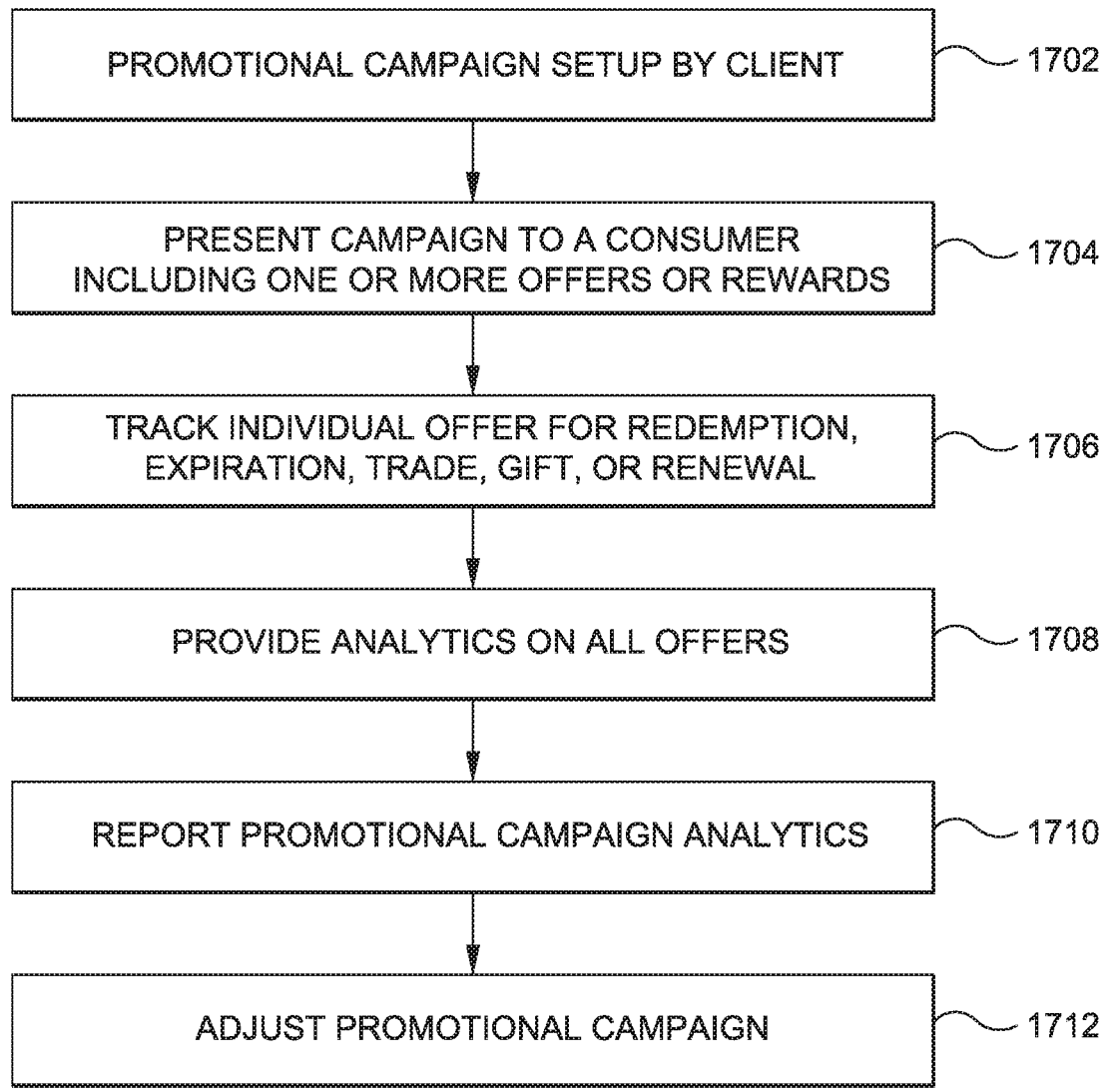
FIG. 17 is an exemplary process flow of implementing a smart incentive system.

The disclosed embodiments described above may be used to implement an incentive-based campaign in which one or more smart offers or rewards is presented to a user to inspire specific user behaviors. FIG. 17 discloses an exemplary process for implementing such a campaign. In FIG. 17, step 1702, a campaign is set up by a client.

As described above, a client may set up a campaign utilizing the client campaign management portal. The client may choose which offers to present, what (if any) gamification techniques to incorporate during the presentation of the offer, potential survey questions, other qualifying activities like a registration form, rules for presenting predetermined offers, etc. The client may then launch the campaign for presentation to users.

In step 1704, the campaign, including one or more offers, is presented to a user. This can be done in a variety of ways through a number of different mediums. For example, the offer may be presented on a user's device, such as a smartphone, tablet, or other computing device, or a client device such as a client tablet, point of sale system, kiosk, computer, digital signage, etc. Often the offer is presented to user with gamification techniques so that the user may feel as though he or she has won or earned the value of the offer. For example, a user who is about to pay a bill for goods or services may be presented with an offer using a client point of sale system, electronic signage, tablet computing device, etc. The device may ask the user whether the user would like to pay for the bill or play for the bill. The user then has the option to play a short game. A game may be any suitable game such as spinning a wheel with multiple prizes or the like. The outcomes of the game allow the user to win something at the client's establishment.

In some embodiments, a game is presented on a client presentation device such as the client smartphone, tablet, point of sale system, kiosk, computer, digital signage, etc. The user plays the game, and wins one of the plurality of prizes which may be various offers at the client's establishment. The offer is a smart offer described above and is sent to the user via a user's email address, phone number, social media page, or printer to be later redeemed by the user.

Clients, via the campaign management portal, may decide how to brand the game, what prizes are awarded, and how people may qualify to play the game. Such qualifiers may include outside qualifiers or direct payment. An outside qualifier may include a desired user behavior for which the client wishes to create an incentive. For example, qualifiers may include criteria to bring a certain sized group to an establishment, to answer a predetermined number of survey questions, to patronize the establishment a predetermined number of time, to spend a predetermined amount of money at the establishment, to rate the establishment on social media or other website, and the like.

The client may also require direct payment to play. In this instance, the user would be required to pay a predetermined amount of consideration in order to play the game. As a result of playing the game, the user may be guaranteed to win at least the predetermined amount of consideration paid in the form of a special coupon, gift card or some other type of reward, but also has a chance to win something more than the original predetermined amount.

In this manner, the user does not risk anything, such as in gambling, because the user will get at least the predetermined amount of money in value back, such as for use on a future purchase. However, the user may also get an additional discount or prize. The user may even win an award to cover the full value of whatever she was about to purchase (up to a certain maximum). In jurisdictions with regulations under sweepstakes law, the system may incorporate alternate methods of entry for compliance with such regulations.

The offer may further be presented based on a number of different criteria. For example, one of a plurality of offers selected by a client for a campaign may be offered to the end user based on certain predetermined rules. Such rules may correspond to factors such as time of day, temperature, or other environmental conditions that are obtained by a client or user device. Further, rules may be based on factors such as past performance of offers and a desired user action. The rules for selecting one of the offers may weigh the above factors equally, or may give preference to some factors over others.

In one embodiment, an offer may be presented on a client device such as a point of sale system, digital signage, a tablet, or the like. The client device includes one or more sensors such as a camera, motion sensor, microphone, etc. The client device preferably includes a networking transceiver allowing the device access to a local network and/or the Internet. The client device determines a number of conditions relating to factors corresponding to rules to present one of the plurality of offers. For example, the client device may determine or sense a current time, temperature, motion of one or more users, a number of potential nearby users, likely demographics of the nearby users, past performance of offers already used, etc. The client device may then select an offer based on the predetermined rules according to the factors obtained by the client device. This is configured in the campaign management system described previously. The selected offer is then presented to the user.

For example, using the system, a coffee shop could change the content of its digital signage based on multiple factors such as the time of day, the weather, the number of people walking or driving by, whether or not those people appear to be male or female, and additional factors. So if it is a cold evening in December, and a large group of college-age people are walking by, the system would calculate the assigned importance of these factors to show an offer that might say something like: "Feeling lost in the crowd? Take a break from studying and grab a hot chocolate inside." If, however, it is a hot afternoon, and one older person is walking by slowly, the system might select a different offer that says something like: "Thinking about old times? Touch the screen to see if you've won a free ice cold lemonade like Mom used to make." In short, the system allows the client to deliver more environmentally relevant information and/or interactive experiences to individuals based on precisely what is happening around them at that second. The offer may include an interactive experience like a game or questionnaire, or it can be a more standard advertisement that simply changes based on which version is selected automatically by the system given the weighted factors.

Once the offer or prize is awarded and sent to the user, the offer is recorded in the server to track the offer for redemption, expiration, trading, gifting, or renewal of the offer, as shown in step 1706. As explained above, the smart offers are recorded in memory in the server and may be tracked so that information regarding an action (or inaction) that a user takes with respect to the offer is obtained. Such actions may include redeeming the offer, trading the offer for another offer, gifting the offer to someone else, or allowing the offer to expire. As explained above, the system may further allow the user to renew the offer or exchange the offer upon the expiration of the offer.

In step 1708, the server compiles information of all the offers in the promotional campaign. The server also compiles anonymous analytics on all campaigns within the system to evaluate the effectiveness of the offers and campaigns.

In step 1710, the results of the analytics may be provided to the client. Finally, in step 1712, the system or the client may adjust virtually any aspect of the campaign (the rules, the rewards, the gamification features, etc.) based on the report received in step 1710. For example, rules for weighing the factors to select one of a plurality of offers may be changed manually or automatically according to results of the analytics.

In the above described embodiments, the system improves offer effectiveness by improving how offers are presented (such as by determining when to present certain offers and/or by pairing offers with the above described gamification techniques), and by improving the nature of how a reward is used. That is, the system improves how an offer is distributed, redeemed, evolved, and tracked; and improves how the system conducts data mining to derive applicable insights that can be used to improve the offers and rewards or other departments or business areas of clients.

In this manner, utilizing the disclosed system, clients can drive user behavior to keep a user returning to the client's establishment. Further, even if the user never returns to the establishment, the qualifying transaction (such as answering a question, registering for a loyalty club, spending a certain amount of money, etc.) delivers significant benefits, and the smart rewards system may allow the value in the offer to be transferred to a potential new user.

Figure 15:
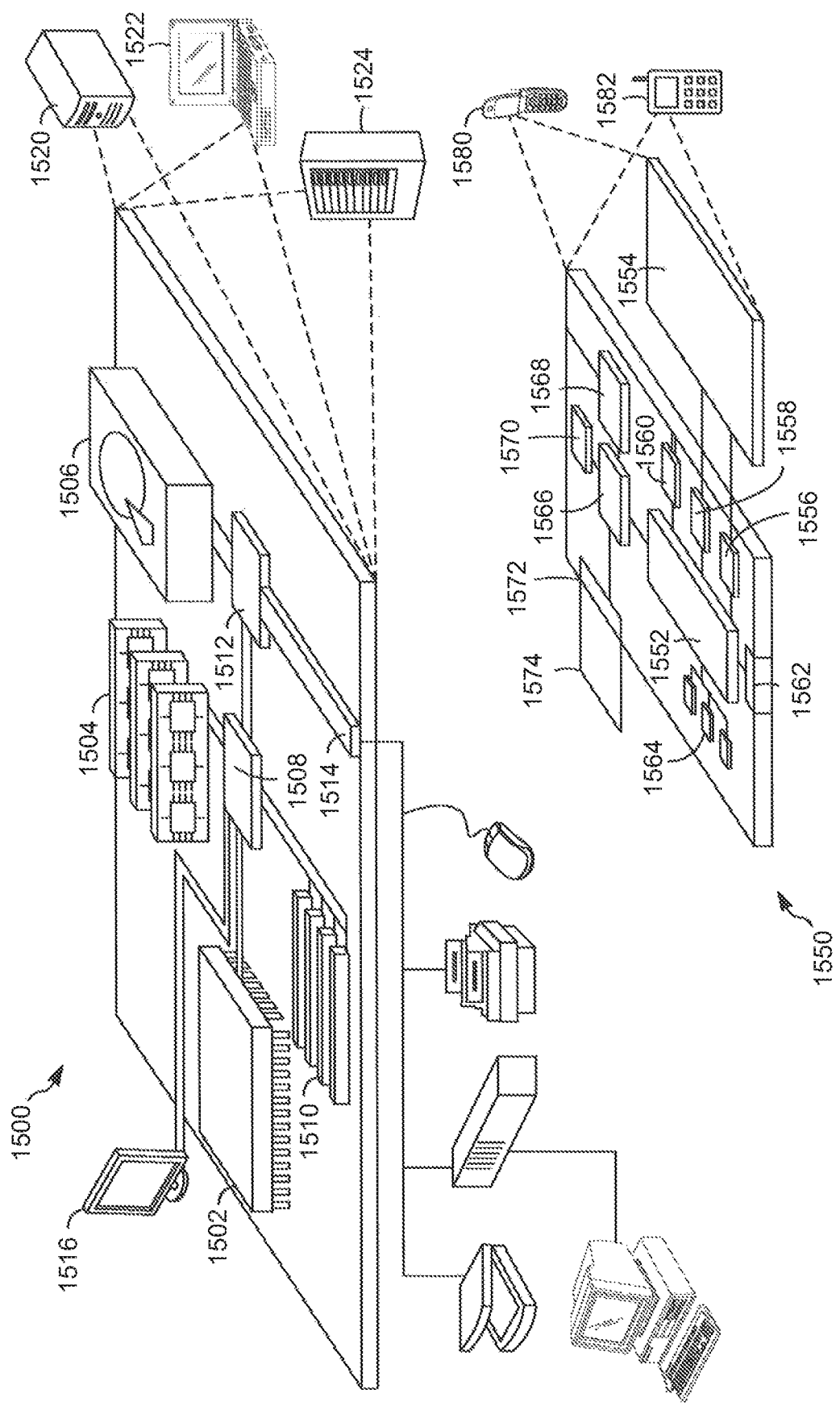
FIG. 15 shows exemplary system architecture that may be utilized in a smart incentive system according to one exemplary embodiment of the invention.

FIG. 15 is a block diagram showing example or representative computing devices and associated elements that may be used to implement the systems method and apparatus described herein. FIG. 15 shows an example of a generic computing device 1500 and a generic mobile computing device 1550, which may be used with the techniques described here. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface or controller 1508 connecting to memory 1504 and high-speed expansion ports 1510, and a low-speed interface or controller 1512 connecting to low-speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high-speed controller 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high-speed controller 1508 manages bandwidth-intensive operations for the computing device 1500, while the low-speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed bus 1514. The low-speed bus 1514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provide in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provide as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, Wife, or other such transceiver (not shown). In addition, GPS (Global Positioning system) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smart phone 1582, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 1500 and/or 1550) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 1500 and 1550 are configured to receive and/or retrieve electronic documents from various other computing devices connected to computing devices 1500 and 1550 through a communication network, and store these electronic documents within at least one of memory 1504, storage device 1506, and memory 1564. Computing devices 1500 and 1550 are further configured to manage and organize these electronic documents within at least one of memory 1504, storage device 1506, and memory 1564 using the techniques described herein.

Figure 16:
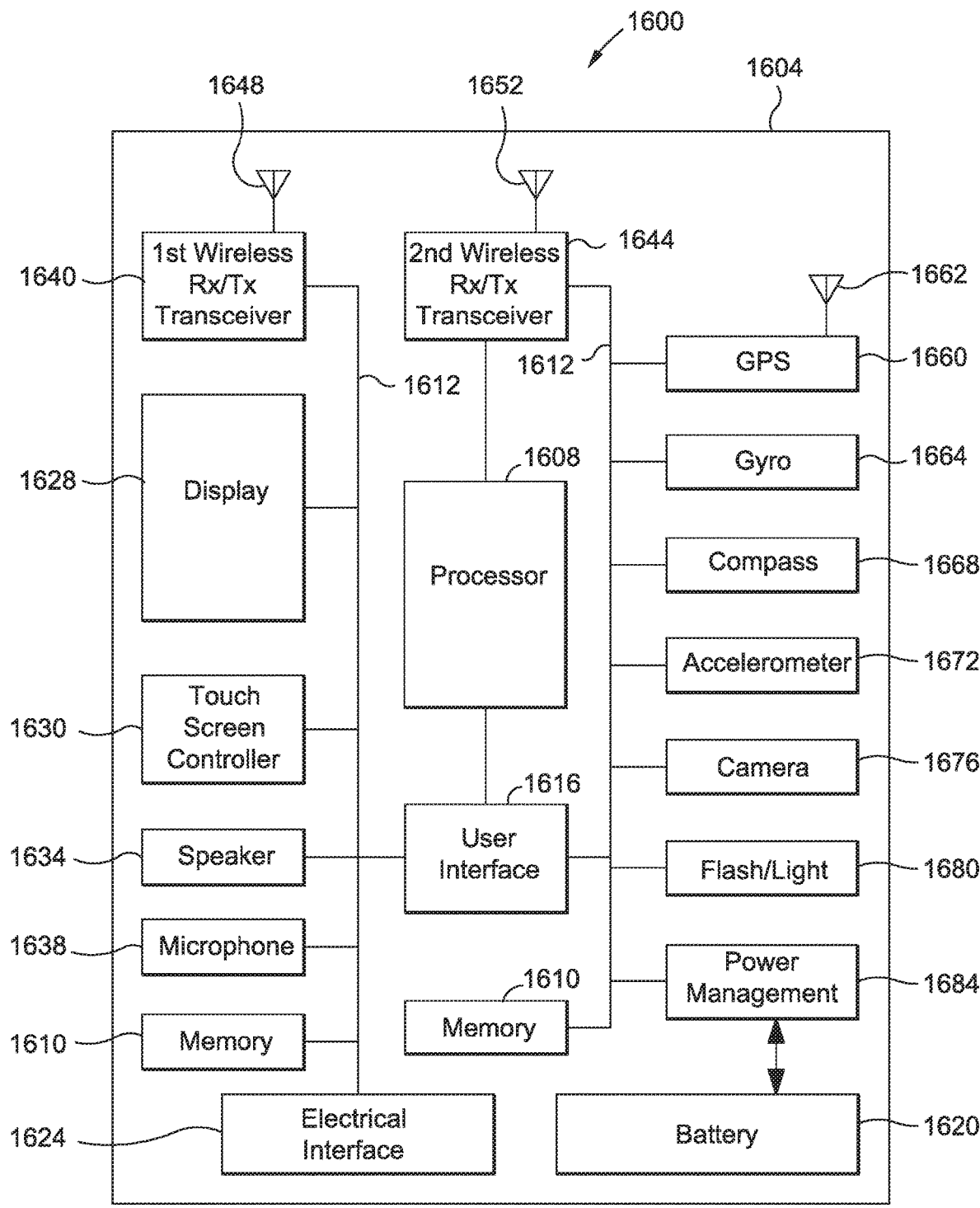
FIG. 16 shows exemplary mobile device architecture that may be utilized in a smart incentive system according to one exemplary embodiment of the invention.

FIG. 16 illustrates an example embodiment of a mobile device 1600. This is but one possible device configuration, and as such it is contemplated that one of ordinary skill in the art may differently configure the mobile device. The device 1600 may comprise any type of fixed or mobile communication device that can be configured in such a way so as to function as described below. The mobile device may comprise a PDA, cellular telephone, smart phone, tablet PC, wireless electronic pad, or any other computing device.

In this example embodiment, the mobile device 1600 is configured with an outer housing 1604 that protects and contains the components described below. Within the housing 1604 is a processor 1608 and a first and second bus 1612, 1612 (collectively 1612). The processor 1608 communicates over the buses 1612 with the other components of the mobile device 1600. The processor 1608 may comprise any type of processor or controller capable of performing as described herein. The processor 1608 may comprise a general purpose processor, ASIC, ARM, DSP, controller, or any other type processing device.

The processor 1608 and other elements of the mobile device 1600 receive power from a battery 1620 or other power source. An electrical interface 1624 provides one or more electrical ports to electrically interface with the mobile device 1600, such as with a second electronic device, computer, a medical device, or a power supply/charging device. The interface 1624 may comprise any type of electrical interface or connector format.

One or more memories 1610 are part of the mobile device 1600 for storage of machine readable code for execution on the processor 1608, and for storage of data, such as image data, audio data, user data, medical data, location data, shock data, or any other type of data. The memory may store the messaging application (app). The memory may comprise RAM, ROM, flash memory, optical memory, or micro-drive memory. The machine readable code as described herein is non-transitory.

As part of this embodiment, the processor 1608 connects to a user interface 1616. The user interface 1616 may comprise any system or device configured to accept user input to control the mobile device. The user interface 1616 may comprise one or more of the following: keyboard, roller ball, buttons, wheels, pointer key, touch pad, and touch screen. A touch screen controller 1630 is also provided which interfaces through the bus 1612 and connects to a display 1628.

The display comprises any type of display screen configured to display visual information to the user. The screen may comprise an LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 1628 receives signals from the processor 1608 and these signals are translated by the display into text and images as is understood in the art. The display 1628 may further comprise a display processor (not shown) or controller that interfaces with the processor 1608. The touch screen controller 1630 may comprise a module configured to receive signals from a touch screen which is overlaid on the display 1628. Messages may be entered on the touch screen 1630, or the user interface 1616 may include a keyboard or other data entry device.

Also part of this exemplary mobile device is a speaker 1634 and microphone 1638. The speaker 1634 and microphone 1638 may be controlled by the processor 1608 and are configured to receive and convert audio signals to electrical signals, in the case of the microphone, based on processor control. Likewise, processor 1608 may activate the speaker 1634 to generate audio signals. These devices operate as is understood in the art and as such are not described in detail herein.

Also connected to one or more of the buses 1612 is a first wireless transceiver 1640 and a second wireless transceiver 1644, each of which connect to respective antenna 1648, 1652. The first and second transceiver 1640, 1644 are configured to receive incoming signals from a remote transmitter and perform analog front end processing on the signals to generate analog baseband signals. The incoming signal may be further processed by conversion to a digital format, such as by an analog to digital converter, for subsequent processing by the processor 1608. Likewise, the first and second transceiver 1640, 1644 are configured to receive outgoing signals from the processor 1608, or another component of the mobile device 1608, and up-convert these signal from baseband to RF frequency for transmission over the respective antenna 1648, 1652. Although shown with a first wireless transceiver 1640 and a second wireless transceiver 1644, it is contemplated that the mobile device 1600 may have only one such system or two or more transceivers. For example, some devices are tri-band or quad-band capable, or have Bluetooth and NFC communication capability.

It is contemplated that the mobile device, and hence the first wireless transceiver 1640 and a second wireless transceiver 1644 may be configured to operate according to any presently existing or future developed wireless standard including, but not limited to, Bluetooth, WI-FI such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device is one or more systems connected to the second bus 1612 which also interfaces with the processor 1608. These devices include a global positioning system (GPS) module 1660 with associated antenna 1662. The GPS module 1660 is capable of receiving and processing signals from satellites or other transponders to generate location data regarding the location, direction of travel, and speed of the GPS module 1660. GPS is generally understood in the art and hence not described in detail herein.

A gyro 1664 connects to the bus 1612 to generate and provide orientation data regarding the orientation of the mobile device 1604. A compass 1668, such as a magnetometer, provides directional information to the mobile device 1604. An accelerometer 1672, connects to the bus 1612 to provide information or data regarding shocks or forces experienced by the mobile device. In one configuration, the accelerometer 1672 generates and provides data to the processor 1608 when the mobile device experiences a shock or force greater than a predetermined threshold. This may indicate a fall or accident.

One or more cameras (still, video, or both) 1676 are provided to capture image data for storage in the memory 1610 and/or for possible transmission over a wireless or wired link or for viewing at a later time. The processor 1608 may process image data to perform image recognition, such as in the case of, facial detection, item detection, facial recognition, item recognition, or bar/box code reading.

A flasher and/or flashlight 1680 are provided and are processor controllable. The flasher or flashlight 1680 may serve as a strobe or traditional flashlight, and may include an LED. A power management module 1684 interfaces with or monitors the battery 1620 to manage power consumption, control battery charging, and provide supply voltages to the various devices which may require different power requirements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included. For example, rewards in the context of marketing has been referred to throughout, other applications of the above embodiments include other incentives working internally within organizations or other services.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement. The described embodiments are to be considered in all respects only as illustrative and not restrictive.

What is claimed is:

1. A method of presenting a dynamic reward to an end user, the method being carried out on a server based system comprising a processor, at least one memory comprising machine-readable instructions for execution by the processor, the method comprising:
   issuing at the server a uniquely identified dynamic reward comprising terms including a number of redemptions, a time period in which the reward may be redeemed, transferability criteria, and terms for modifying the reward after the reward is issued, wherein the terms for modifying the reward after the reward is issued include one or more inputs provided by an end user, wherein the inputs provided by the end user comprise at least one of a response to a question presented by the server and an indication to share the reward;
   monitoring the reward to determine whether the reward has been redeemed, and when the reward is redeemed, decreasing the number of redemptions available on the reward;
   monitoring the reward to determine whether the time period in which the reward may be redeemed is expired and invalidating the number of redemptions when the reward is determined to be expired;
   monitoring the reward to determine whether the transferability criteria of the reward have been met, and when the criteria have been met, transferring the reward from the end user, wherein the transferring of the reward comprises either (i) trading the reward for a second reward available for issuance by the server, (ii) trading the reward with a second reward issued to a second end user, or (iii) sharing the reward with one or more second end users, and, based on the transfer, reissuing the traded reward by the server; and
   monitoring the reward and dynamically modifying at least one of the number of redemptions, the time period in which the reward may be redeemed, and the transferability criteria subsequent to issuing the reward based on the terms for modifying the reward being satisfied.

2. The method of claim 1, wherein the sharing of the reward comprises sharing one or more of the number of redemptions with the one or more second end users.

3. The method of claim 1, wherein the sharing of the reward comprising duplicating the one or more of the number of redemptions with the one or more second end users.

4. The method of claim 3, wherein the duplicating is limited to a predetermined number of duplications.

5. The method of claim 1, wherein the reward is issued by the server through at least one of email, SMS messaging, Bluetooth, and NFC.

6. The method of claim 1, further comprising transmitting one or more messages to the end user holding the reward.

7. The method of claim 6, wherein the one or more messages comprises a notification concerning an expiration date of the reward.

8. The method of claim 1, wherein the terms for modifying the reward include data from one or more sensors being within a predetermined threshold.

9. The method of claim 8, wherein the one or more sensors comprises any of an environmental sensor and a demographic sensor.

10. The method of claim 9, wherein the one or more sensors comprise any of a thermometer, a humidity sensor, an infrared sensor, a luminosity sensor, a timer, a clock, a microphone, and a camera.

11. An incentive based campaign management system comprising:
- a server comprising a processor and at least one memory, the server being configured to present application programming interfaces to a client presentation device, the application programming interfaces including tools to manage one or more incentive based campaigns;
- a rules database comprising one or more memories comprising modules for including in an incentive based campaign; and
- a historical systems database comprising one or more memories storing historical outcomes of incentive based campaigns;
- the server storing program instructions which when executed cause the server to:
  - receive input from a client presentation device via one of the application programming interfaces to create a set of campaigns including a reward wherein the reward comprising transferability criteria;
  - receive a request from an end user to access the one or more campaigns;
  - receive data from one or more demographic sensors, wherein the one or more demographic sensors comprise any of a camera and a microphone, wherein the data received from the one or more demographic sensors is concerning a demographic of the end user;
  - based on the detected demographic data of the end user received from the one or more demographic sensors, determining whether the detected demographic data of the end user meets a demographic threshold of any of the one or more campaigns; and
  - when the demographic threshold is met, presenting a campaign to the end user via an end user presentation device, wherein presentation of the campaign to the end user is based on a plurality of factors at the time the request from the end user was received, wherein each of the plurality of factors is assigned a weight, wherein the plurality of factors include any of a time of day, week, month, or year; a current temperature; a likely demographic of a detected user; a number of potential detected users; an amount of traffic in a nearby area; and past campaign performance; and
  - monitoring the reward to determine whether the transferability criteria of the reward have been met, and when the criteria have been met, transferring the reward from the end user, wherein the transferring of the reward comprises either (i) trading the reward for a second reward available for issuance by the server, (ii) trading the reward with a second reward issued to a second end user, or (iii) sharing the reward with one or more second end users, and, based on the transfer, reissuing the traded reward by the server.

12. The system of claim 11, wherein the client presentation device adds one or more of a game, a question, a reward, and third party embedded content stored on a third party data source database via the application programming interfaces.

13. The system of claim 12, wherein the server presents the reward to the end user presentation device upon receiving at least one of completion of the game and answering of the question from the end user presentation device.

14. The system of claim 11, wherein the client presentation device and the end user presentation device comprise at least one of a kiosk, personal computer, mobile computing device, point of sale system, and digital signage.

* * * * *